(12) United States Patent
Ikezaki et al.

(10) Patent No.: US 11,931,949 B2
(45) Date of Patent: Mar. 19, 2024

(54) FILAMENT WINDING DEVICE

(71) Applicant: Murata Machinery, Ltd., Kyoto (JP)

(72) Inventors: Shu Ikezaki, Kyoto (JP); Motohiro Tanigawa, Kyoto (JP); Tadashi Uozumi, Kyoto (JP); Hirotaka Wada, Kyoto (JP); Takahiro Miura, Kyoto (JP); Makoto Tanaka, Kyoto (JP); Masatsugu Goyude, Kyoto (JP); Shota Miyaji, Kyoto (JP); Daigoro Nakamura, Kyoto (JP); Tetsuya Matsuura, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 377 days.

(21) Appl. No.: 17/421,896

(22) PCT Filed: Dec. 17, 2019

(86) PCT No.: PCT/JP2019/049466
§ 371 (c)(1),
(2) Date: Jul. 9, 2021

(87) PCT Pub. No.: WO2020/149076
PCT Pub. Date: Jul. 23, 2020

(65) Prior Publication Data
US 2022/0112046 A1 Apr. 14, 2022

(30) Foreign Application Priority Data
Jan. 15, 2019 (JP) .................... 2019-004571

(51) Int. Cl.
*B29C 53/60* (2006.01)
*B29C 53/80* (2006.01)

(52) U.S. Cl.
CPC ........ *B29C 53/602* (2013.01); *B29C 53/8016* (2013.01); *B29C 53/8091* (2013.01)

(58) Field of Classification Search
CPC ... B29C 53/58; B29C 53/602; B29C 53/8016; B29C 53/8091; B29C 53/64; B29C 53/66; B29C 53/70; B65H 54/71
See application file for complete search history.

(56) References Cited

U.S. PATENT DOCUMENTS

2013/0248637 A1    9/2013   Tanigawa et al.
2013/0306783 A1   11/2013   Tanigawa et al.

FOREIGN PATENT DOCUMENTS

JP    H07-125934 A    5/1995
JP    2001-063921 A    3/2001
(Continued)

*Primary Examiner* — John L Goff, II
(74) *Attorney, Agent, or Firm* — DLA Piper LLP (US)

(57) ABSTRACT

A filament winding device includes a fiber bundle retainer that temporarily retains fiber bundles. The fiber bundle retainer includes: a reel member including an outer peripheral portion having pins movable in the axial direction relative to the fiber bundles supplied through fiber bundle guides and rotatable about the axis of the liner, the reel member capable of winding the fiber bundles onto the outer peripheral portion; a first cutting unit configured to cut a part of each of the fiber bundles in the circumferential direction, the part being between a part of the fiber bundle wound on the outer peripheral portion and a part of the fiber bundle wound on the liner; and a second cutting unit different from the first cutting unit and configured to cut a part of each of the fiber bundles in the axial direction, the part being wound on the outer peripheral portion.

6 Claims, 22 Drawing Sheets

(56) References Cited

FOREIGN PATENT DOCUMENTS

| | | | |
|---|---|---|---|
| JP | 2013-063587 | A | 4/2013 |
| JP | 2014-205305 | A | 10/2014 |
| JP | 5643322 | B2 | 12/2014 |
| JP | 2015-003405 | A | 1/2015 |

LEADING END SIDE ⟵⟶ BASE END SIDE
AXIAL DIRECTION

LEADING END SIDE ⟵⟶ BASE END SIDE
AXIAL DIRECTION

LEADING END SIDE ⟵⟶ BASE END SIDE
AXIAL DIRECTION

LEADING END SIDE ⟵⟶ BASE END SIDE
AXIAL DIRECTION

FILAMENT WINDING DEVICE

TECHNICAL FIELD

This disclosure relates to a filament winding device that winds a fiber bundle onto a liner.

BACKGROUND

A filament winding device recited in Japanese Patent No. 5643322 includes a liner transporter and a helical winding device. The liner transporter supports a liner to be movable in the axial direction and rotatable about the axis. The helical winding device includes fiber bundle guides that guide fiber bundles to the liner. As the liner rotates and moves in a state in which leading end portions of the fiber bundles are fixed to the surface of the liner, the fiber bundles are supplied to the liner through the guides and helical winding is achieved.

The filament winding device further includes a yarn end processor (fiber bundle retainer) that temporarily retains the fiber bundles when the liner is replaced. The fiber bundle retainer includes a reel member on which the fiber bundles are temporarily wound in the circumferential direction of the liner and a cutter by which the fiber bundles are cut as described below. To be more specific, the reel member has pins that are aligned in the circumferential direction, are movable in the axial direction of the liner, and are rotatable about the axis of the liner.

After completion of the helical winding to a liner, the pins move toward the liner in the axial direction, and enter into the fiber bundles in the circumferential direction. As the pins rotate about the axis of the liner, the fiber bundles are wound onto the pins and their surroundings. Then a part of each fiber bundle, which is between the liner and the reel member, is cut by the cutter. As a result, it becomes possible to replace the liner on which the helical winding has been completed with a new liner. The leading end portions of the fiber bundles supplied through the guides are temporarily retained by the reel member. The fiber bundles retained by the reel member are then wound onto an end portion in the axial direction of the liner that has been newly attached to the liner transporter. Then a part of each fiber bundle, which is between the new liner and the reel member, is cut by the cutter. In this way, it is possible to start the helical winding onto the new liner.

In the fiber bundle retainer of JP '322, it is necessary to remove a remaining fiber bundle (remaining yarn) wound onto the reel member after the part of each fiber bundle between the new liner and the reel member is cut. Removal of the remaining yarn includes, for example, an operation to cut the remaining yarn in the axial direction of the liner. That operation is troublesome because it is manually performed by an operator.

It could therefore be helpful to reduce the time and labor required for the removal of a remaining yarn.

SUMMARY

We thus provide:

A filament winding device may include: a liner supporter which supports a liner to be rotatable about an axis of the liner; and a helical winding unit which includes fiber bundle guides that are aligned in a circumferential direction of the liner and guide fiber bundles to the liner, the filament winding device helical-winding the fiber bundles supplied through the fiber bundle guides onto the rotating liner by moving the liner supporter and the helical winding unit relative to each other in an axial direction of the liner, the filament winding device further comprising a fiber bundle retainer configured to temporarily retain the fiber bundles at least when the liner is replaced, and the fiber bundle retainer including: a reel member which includes an outer peripheral portion having pins that are movable in the axial direction relative to the fiber bundles supplied through the fiber bundle guides and are rotatable about the axis of the liner, the reel member being capable of winding the fiber bundles onto the outer peripheral portion; a first cutting unit configured to cut a part of each of the fiber bundles in the circumferential direction, the part being between a part of the fiber bundle wound on the outer peripheral portion and a part of the fiber bundle wound on the liner; and a second cutting unit which is different from the first cutting unit and configured to cut a part of each of the fiber bundles in the axial direction, the part being wound on the outer peripheral portion.

To begin with, after helical-winding onto a liner, the pins of the reel member move in a relative manner toward the liner and rotate in the circumferential direction while the pins are inserted into the fiber bundles, with the result that the fiber bundles are wound onto the outer peripheral portion. Then a part of each fiber bundle, which is between the liner and the reel member, is cut by the first cutting unit. When the liner on which the helical-winding has been done is, for example, replaced with a new liner, the leading end portions of the fiber bundles supplied through the guides are temporarily retained by the reel member. The fiber bundles retained by the reel member are then fixed to an end portion in the axial direction of the new liner. A part of the fiber bundle between the reel member and the liner is cut by the first cutting unit. Thereafter, it becomes necessary to remove a fiber bundle (remaining yarn) remaining on the outer peripheral portion of the reel member. The operation will be detailed below.

Furthermore, the second cutting unit is able to cut the remaining yarn in the axial direction. This makes it easy to remove the remaining yarn from the outer peripheral portion. The time and labor required for removing the remaining yarn are therefore reduced.

The filament winding device of the first aspect may be arranged such that the second cutting unit cuts the fiber bundles by moving toward one side in the axial direction, and the fiber bundle retainer includes at least one fiber bundle pressing member configured to restrict movement of the fiber bundles wound on the outer peripheral portion of the reel member toward the one side in the axial direction.

When the remaining yarn is cut by the second cutting unit, if the remaining yarn is pushed by the second cutting unit moving in the axial direction, the remaining yarn may slip in the axial direction and may not be smoothly cut. The slipping and deviation of the remaining yarn in the axial direction are suppressed by the fiber bundle pressing member. Smooth cutting of the remaining yarn is therefore facilitated.

The filament winding device immediately above may be arranged such that the at least one fiber bundle pressing member comprises plural fiber bundle pressing members, and the fiber bundle pressing members are provided to oppose each other over the second cutting unit.

Because the movement of the remaining yarn in the axial direction is restricted on the both sides over the second cutting unit, it is possible to further ensure the suppression of the deviation of the remaining yarn in the axial direction.

The filament winding device may be arranged such that the fiber bundle retainer includes a first peel-off portion which is movable between a predetermined standby position and a contact position different from the standby position, and the first peel-off portion moves from the standby position to the contact position and makes contact with the fiber bundles wound on the outer peripheral portion of the reel member from inside in the radial direction of the liner to lift up the bundles outward in the radial direction.

Because the fiber bundles are wound to be entwined with the outer peripheral portion including the pins, the remaining yarn may not be easily removed even after the remaining yarn is cut in the axial direction by the second cutting unit. The remaining yarn having been cut by the second cutting unit is lifted up from the outer peripheral portion by the first peel-off portion. It becomes easier to remove the remaining yarn.

The filament winding device immediately above may be arranged such that the contact position is on one side of the standby position in the axial direction, the first peel-off portion has a contact surface which extends outward in the radial direction toward the other side in the axial direction and is provided at least partially outside the outer peripheral portion in the radial direction, and the first peel-off portion is movable in the axial direction.

For example, the first peel-off portion may be arranged to be movable in the radial direction. This arrangement, however, is disadvantageous in that the structure of the fiber bundle retainer may become complicated. The remaining yarn can be lifted up outward in the radial direction from the outer peripheral portion by the contact surface, as the first peel-off portion is simply moved in the axial direction. As such, the remaining yarn can be lifted up from the outer peripheral portion by a simple arrangement.

The filament winding device immediately above may be arranged such that the fiber bundle retainer includes a second peel-off portion which has insertion holes into which the pins are insertable and is movable in a direction in which each of the pins extends, and the second peel-off portion is movable between a retracted position where the pins are inserted into the insertion holes and a pushing position that is closer to leading ends of the pins than the retracted position in the direction in which each of the pins extends.

As described above, the fiber bundles are wound to be entwined with the outer peripheral portion including the pins. At least part of the remaining yarn is therefore typically entwined around each pin, and such a remaining yarn must be removed. As the second peel-off portion is moved from the retracted position to the pushing position, the remaining yarn entwined around each pin can be pushed out by the second peel-off portion. It is therefore possible to effectively remove the remaining yarn entwined around the pins.

The filament winding device immediately above may be arranged such that the pins extend along the axial direction, the contact position is closer to the leading ends of the pins than the standby position in the axial direction, the first peel-off portion is movable in the axial direction, the contact surface extends outward in the radial direction toward base ends of the pins in the axial direction, the first peel-off portion includes: a supporter which supports the second peel-off portion to be movable in the axial direction relative to the first peel-off portion; a first regulatory portion which is provided at an end portion on the base end side in the axial direction of the supporter to restrict relative movement of the second peel-off portion toward the base end side; and a second regulatory portion which is provided at an end portion on the leading end side in the axial direction of the supporter to restrict relative movement of the second peel-off portion toward the leading end side, in the axial direction, distance at which the second peel-off portion is able to move relative to the first peel-off portion is shorter than distance between the standby position and the contact position, and the second peel-off portion is separated from the first peel-off portion when the first peel-off portion is at the standby position.

In an arrangement in which the first peel-off portion and the second peel-off portion operate independently, the structure of the fiber bundle retainer may be complicated. Meanwhile, in an arrangement in which the first peel-off portion and the second peel-off portion are fixed to each other, an operation to lift up the remaining yarn by the first peel-off portion and an operation to push out the remaining yarn by the second peel-off portion start at the same time. In other words, pushing of the remaining yarn by the second peel-off portion starts before the remaining yarn is completely lifted up by the first peel-off portion. In such an example, it may be difficult to push out the remaining yarn by the second peel-off portion.

As described below, the timing to start the operation of the first peel-off portion and the timing to start the operation of the second peel-off portion are arranged to be deviated from each other by a simple arrangement. To begin with, when the first peel-off portion starts to move from the standby position to the contact position in the axial direction, the second peel-off portion is separated from the first regulatory portion (i.e., the second peel-off portion is not in contact with the first regulatory portion). It is therefore possible to move the second peel-off portion relative to the first peel-off portion while the first peel-off portion is moving toward the leading end side in the axial direction. In other words, it is possible to keep the second peel-off portion to be stopped relative to the remaining yarn at least immediately after the start of the movement of the first peel-off portion. It is therefore possible to lift the remaining yarn outward in the radial direction by the contact surface by moving the first peel-off portion while keeping the second peel-off portion to be stopped relative to the remaining yarn.

In regard to the above, in the axial direction, the distance at which the second peel-off portion is able to move relative to the first peel-off portion is shorter than the distance between the standby position and the contact position. On this account, when the first peel-off portion is further moved toward the leading end side in the axial direction, the first regulatory portion makes contact with the second peel-off portion during the movement of the first peel-off portion. Because the movement of the second peel-off portion toward the base end portion in the axial direction relative to the first regulatory portion is restricted, the second peel-off portion is moved toward the leading end side in the axial direction by the first regulatory portion. In this way, it is possible to start the operation of the second peel-off portion after the start of the operation of the first peel-off portion. On this account, the operation of the second peel-off portion can be started after the remaining yarn is lifted up from the outer peripheral portion to some degree by the first peel-off portion. This makes it easy to peel off the remaining yarn by the second peel-off portion. When the first peel-off portion is returned from the contact position to the standby position, the second peel-off portion is moved by the second regulatory portion toward the base end side in the axial direction.

The filament winding device may be arranged so that the axial direction includes at least a horizontal component, and the second cutting unit cuts the fiber bundles wound on the outer peripheral portion of the reel member, at the highest position in the vertical direction.

We make it easier to cause the remaining yarn having been cut in the axial direction to drop off from the reel member by its own weight. It becomes easier to remove the remaining yarn.

BRIEF DESCRIPTION OF THE DRAWINGS

FIG. 12A shows a first peel-off portion whereas

Figure 1:
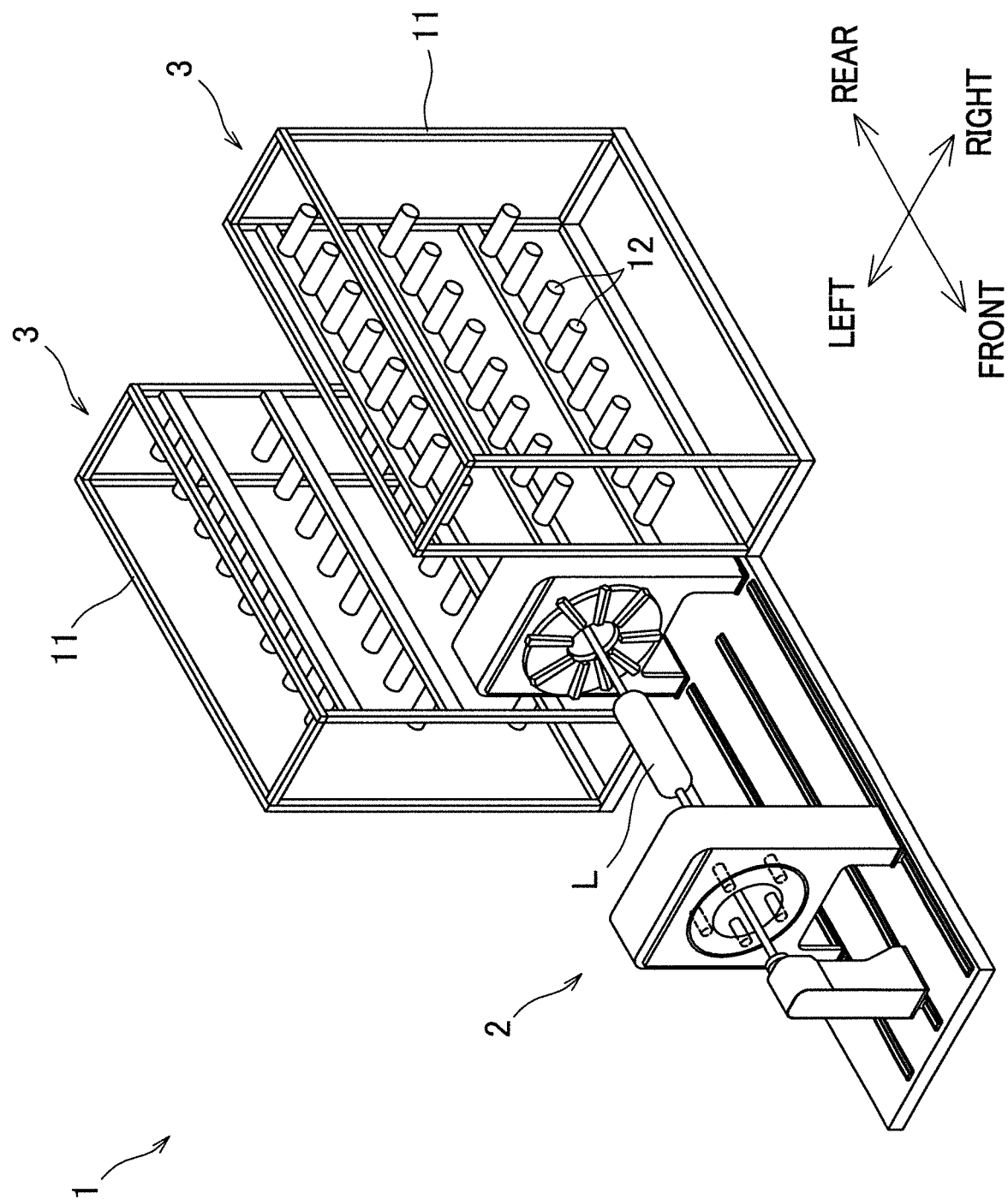
FIG. 1 is a perspective view of a filament winding device related to an example.

REFERENCE SIGNS LIST 1 filament winding device
30 supporting unit (liner supporter)
50 helical winding unit
58 guide member (fiber bundle guide)
60 fiber bundle retainer
61 reel member
62 first cutting unit
72 outer peripheral portion
75 pin
101 second cutting unit
122 pressing member (fiber bundle pressing member)
132 pressing member (fiber bundle pressing member)
162 first peel-off portion
163 second peel-off portion
166a inclined surface (contact surface)
166b supporting portion
166d first regulating surface (first regulatory portion)
167 a second regulating surface (second regulatory portion)
171 through hole (insertion hole)
A distance
B distance
F fiber bundle
L liner

DETAILED DESCRIPTION

The following will describe an example. Directions shown in FIG. 1 are defined as a front-rear direction and a left-right direction, for convenience of explanation. The front-rear direction and the left-right direction are in parallel to the horizontal direction. The front-rear direction and the left-right direction are orthogonal to each other. A direction orthogonal to both the front-rear direction and the left-right direction is referred to as an up-down direction in which the gravity acts.

Filament Winding Device

The following will describe a schematic structure of a filament winding device 1 of an example with reference to FIG. 1. FIG. 1 is a perspective view of the filament winding device 1. The filament winding device 1 includes a winder 2 and a pair of creel stands 3 provided to the left of and the right of a rear portion of the winder 2. On the whole, the filament winding device 1 is arranged to be substantially symmetrical in the left-right direction. In FIG. 1, a part of the winder 2, which is sandwiched between the left and right pair of creel stands 3, is not illustrated to avoid complexity.

The winder 2 is configured to wind fiber bundles (not illustrated in FIG. 1) onto a liner L that is roughly cylindrical in shape. Each fiber bundle is formed by, for example, impregnating a thermosetting or thermoplastic synthetic resin material into a fiber material such as carbon fiber. For example, when a pressure vessel such as a pressure tank is manufactured by the winder 2, a member in which dome-shaped small diameter portions are provided on the both sides of a cylindrical large diameter portion as shown in FIG. 1 is used as the liner L. The liner L is made of a material such as high-strength aluminum, metal, or resin, for example. After the fiber bundles are wound onto the liner L, a thermosetting process such as baking or a cooling process is performed. As a result, a high-strength pressure vessel is obtained as an end product.

The creel stand 3 is arranged so that bobbins 12 on which fiber bundles are wound are supported in a rotatable manner by a supporting frame 11 provided side by side with the winder 2. The fiber bundles supplied from the respective bobbins 12 of the creel stand 3 are used to perform helical winding by a later-described helical winding unit 50.

Winder

Figure 2:
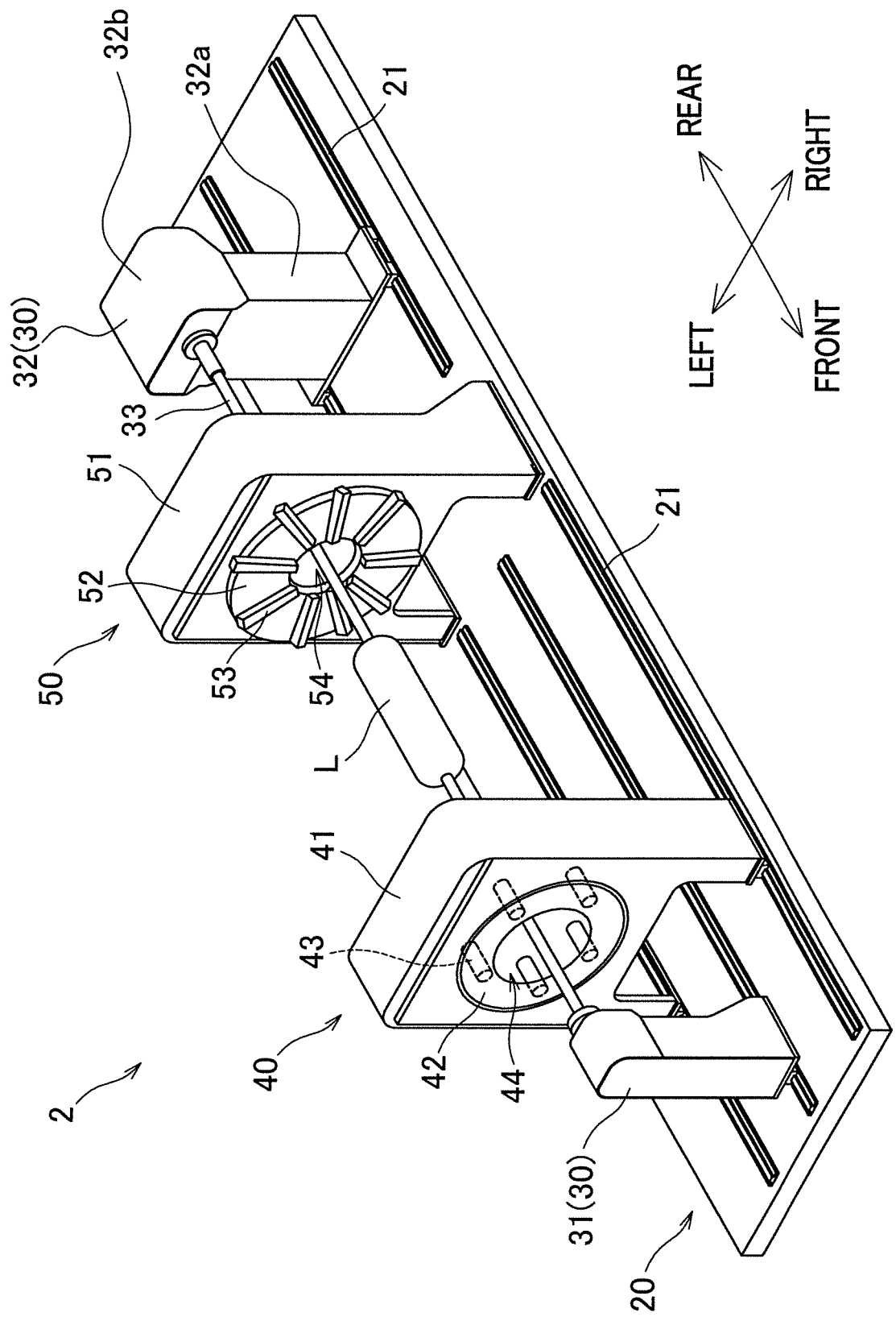
FIG. 2 is a perspective view of a winder.
Figure 3:
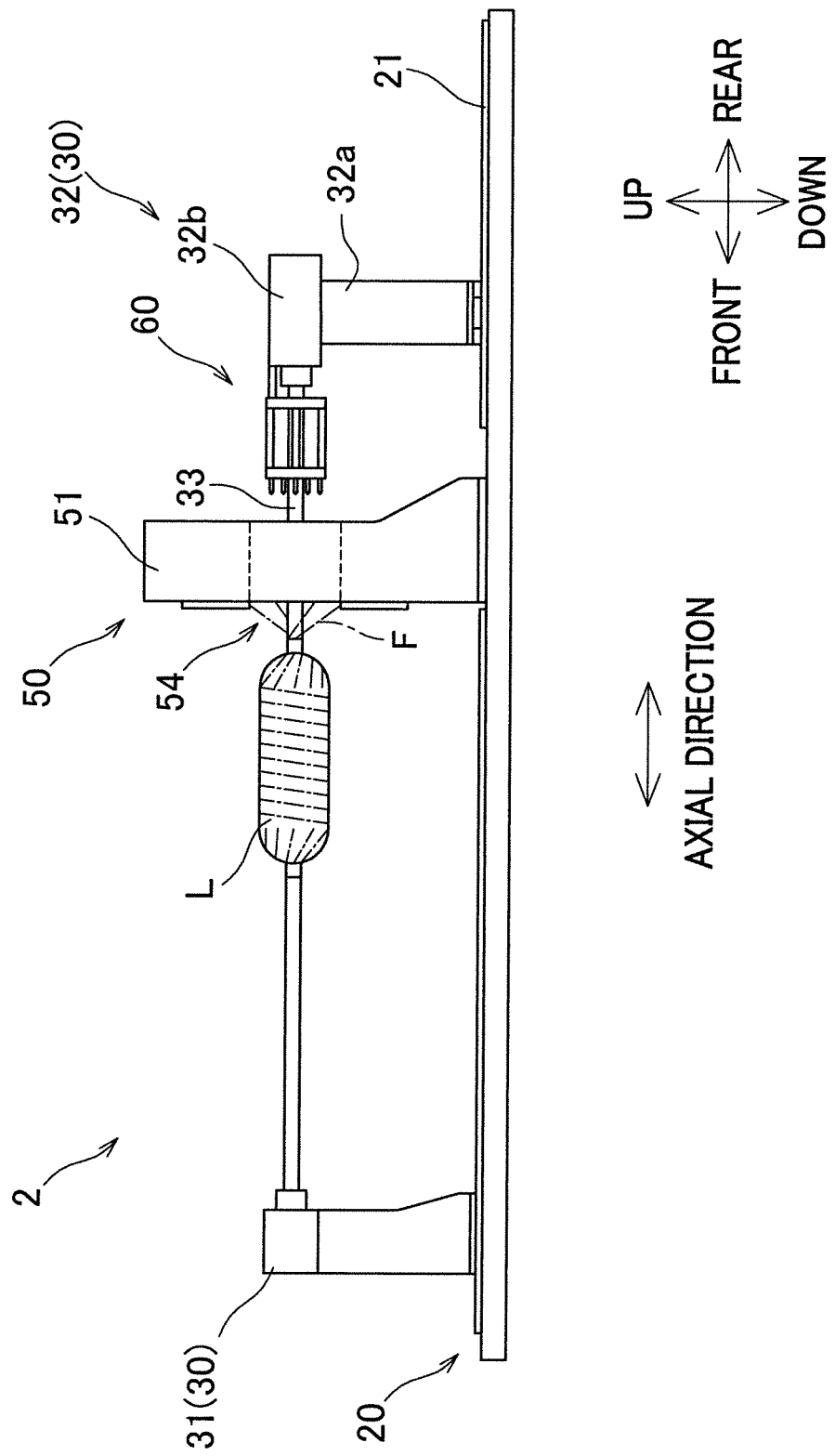
FIG. 3 is a profile of the winder.
Figure 4:
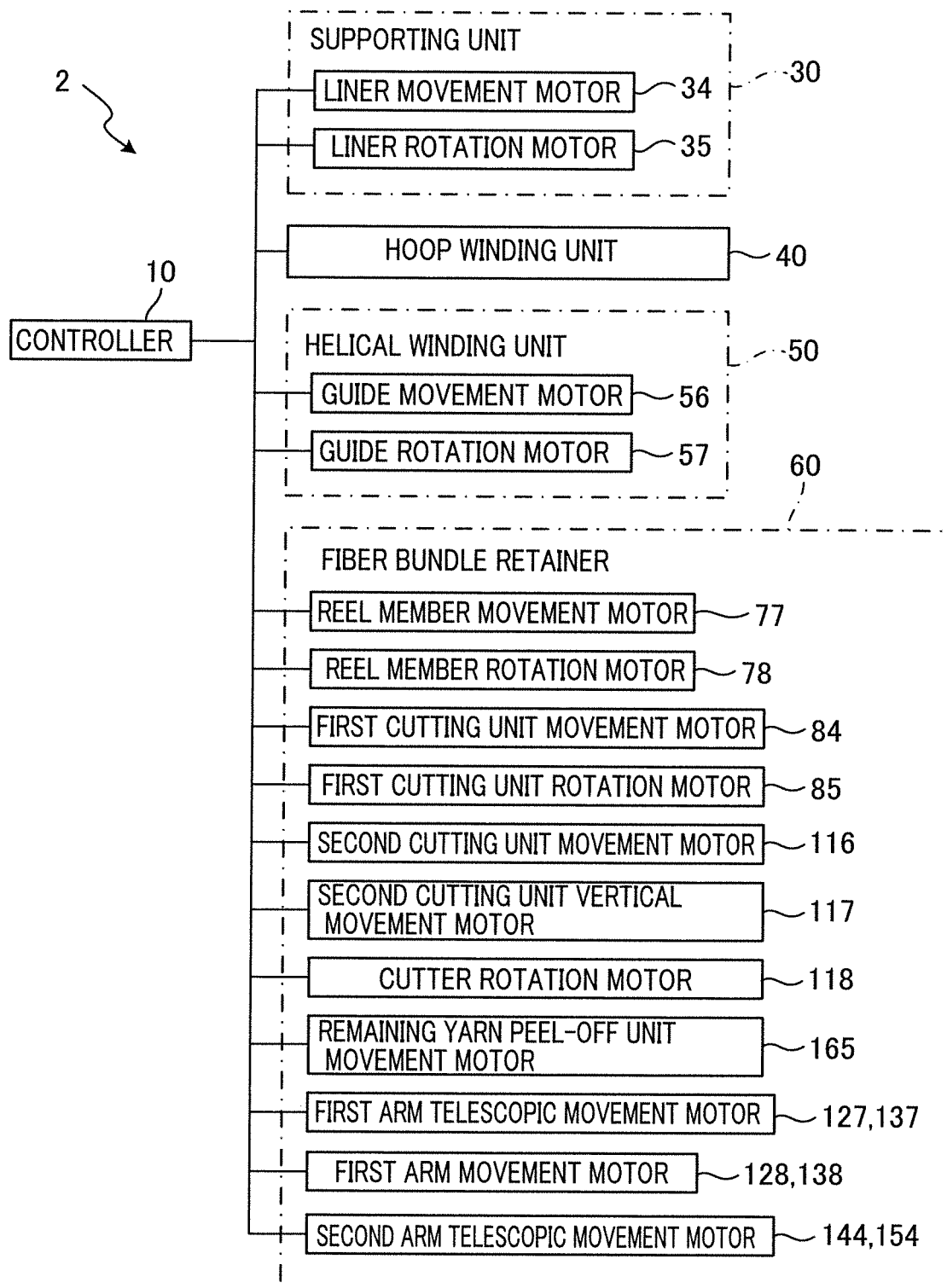
FIG. 4 is a block diagram of an electric configuration of the winder.

The following will describe the structure of the winder 2 with reference to FIGS. 2 to 4. FIG. 2 is a perspective view of the winder 2. FIG. 3 is a profile of the winder 2. FIG. 4 is a block diagram of an electric configuration of the winder 2. As shown in FIGS. 2 and 3, the winder 2 includes a base 20, supporting units 30 (first supporting unit 31 and second supporting unit 32), a hoop winding unit 40, and the helical winding unit 50. FIG. 3 does not show the hoop winding unit 40.

The base 20 supports the supporting units 30, the hoop winding unit 40, and the helical winding unit 50. On the top surface of the base 20, rails 21 are provided to extend in the front-rear direction. The supporting units 30 and the hoop winding unit 40 are provided on the rails 21 and capable of reciprocating in the front-rear direction on the rails 21.

Meanwhile, the helical winding unit 50 is fixed to the base 20. The first supporting unit 31, the hoop winding unit 40, the helical winding unit 50, and the second supporting unit 32 are provided in this order from front to rear.

The supporting units 30 (liner supporters) include the first supporting unit 31 that is placed in front of the hoop winding unit 40 and the second supporting unit 32 that is placed behind the helical winding unit 50. The supporting units 30 support the liner L so that the liner L is rotatable about a supporting shaft 33 that extends in the front-rear direction (i.e., in the axial direction of the liner L). The supporting units 30 include a liner movement motor 34 and a liner rotation motor 35 (see FIG. 4). The liner movement motor 34 moves the first supporting unit 31 and the second supporting unit 32 in the front-rear direction along the rails 21. The liner rotation motor 35 rotates the liner L about the axis by rotating the supporting shaft 33. The liner movement motor 34 and the liner rotation motor 35 are driven and controlled by a controller 10 (see FIG. 4).

The second supporting unit 32 includes a base portion 32a that is movable in the axial direction of the liner L and a head portion 32b provided above the base portion 32a. The head portion 32b is provided with a fiber bundle retainer 60. The fiber bundle retainer 60 will be detailed later.

The hoop winding unit 40 performs hoop-winding on the circumferential surface of the liner L. The hoop-winding is a way of winding fiber bundles in a direction substantially per-pendicular to the axial direction of the liner L. The hoop winding unit 40 includes a main body 41, a rotating member 42, and bobbins 43. The main body 41 is provided on the rails 21 and supports the disc-shaped rotating member 42 such that the rotating member 42 is rotatable about the axis of the liner L. At a central portion of the rotation member 42, a circular passing hole 44 is formed to allow the liner L to pass therethrough. The rotation member 42 supports the bobbins 43 in a rotatable manner. These bobbins 43 are provided at regular intervals in the circumferential direction around the passing hole 44. A fiber bundle is wound onto each bobbin 43.

The hoop winding unit 40 includes a movement motor and a rotation motor that are not illustrated. The movement motor moves the main body 41 in the front-rear direction along the rails 21. The rotation motor rotates the rotation member 42 about the axis of the liner L. The movement motor and the rotation motor are driven and controlled by the controller 10 (see FIG. 4). When performing the hoop-winding, the controller 10 rotates the rotation member 42 while reciprocating the main body 41 along the rails 21. As a result, the fiber bundles are pulled out from the bobbins 43 rotating around the liner L, and the fiber bundles are simultaneously hoop-wound onto the circumferential surface of the liner L.

The helical winding unit 50 performs helical-winding on the circumferential surface of the liner L. The helical-winding is a way of winding fiber bundles in a direction substantially in parallel to the axial direction of the liner L. The helical winding unit 50 includes a main body 51, a frame member 52, and plural nozzle units 53. Although the number of the nozzle units 53 is 9 in this example, the number of the nozzle units 53 is not limited to this. The main body 51 is fixed to the base 20. The frame member 52 is a disc-shaped member attached to the main body 51. At a central portion of the frame member 52, a circular passing hole 54 is formed to allow the liner L to pass therethrough in the front-rear direction. The nozzle units 53 are provided at equal angular intervals in the circumferential direction of the liner L and in a radial manner on the whole. Each nozzle unit 53 is fixed to the frame member 52.

Figure 5A:
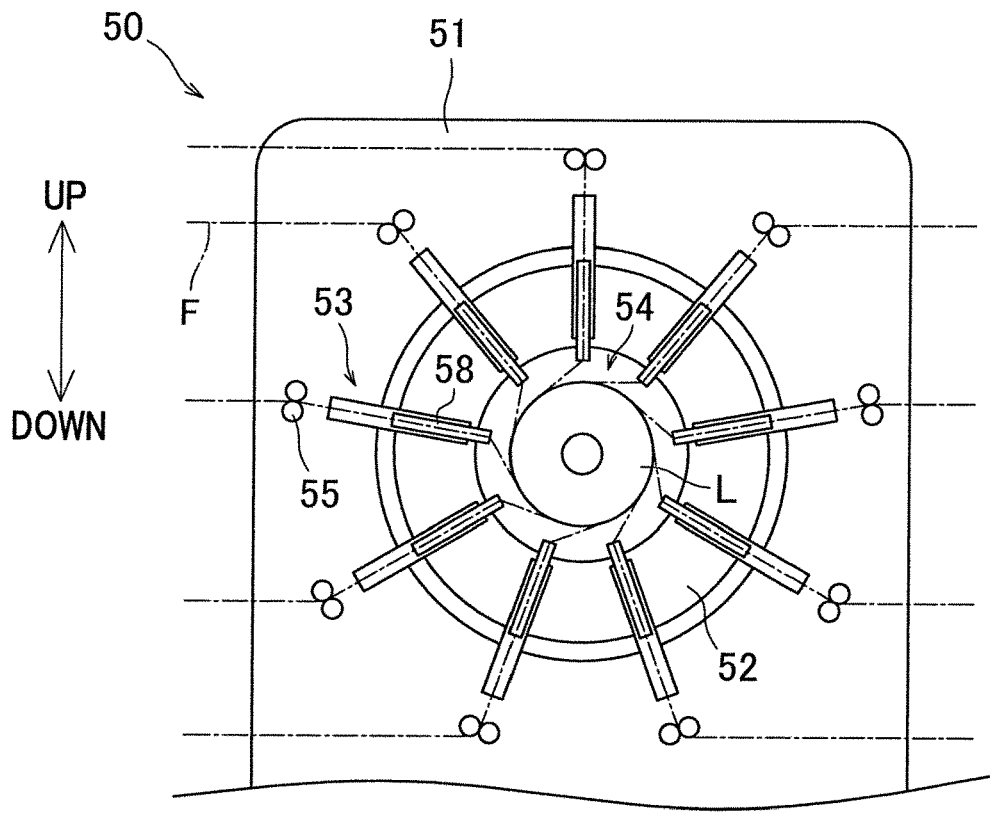
FIGS. 5A and 5B are front views of a helical winding unit.
Figure 5B:
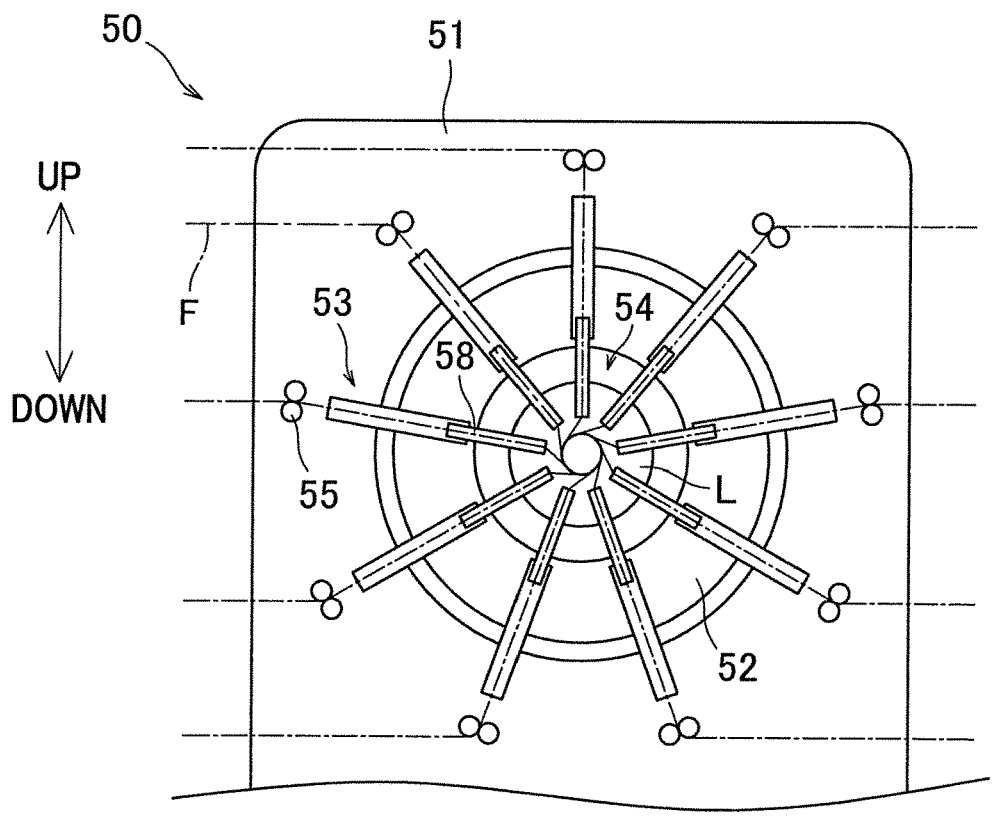

FIGS. 5A and 5B are front elevations of the helical winding unit 50. FIG. 5A shows a situation when the fiber bundles F are wound onto the large diameter portion of the liner L. FIG. 5B shows a situation when the fiber bundles F are wound onto the small diameter portion of the liner L. As shown in FIGS. 5A and 5B, each nozzle unit 53 includes a guide member 58 (fiber bundle guide) that guides the fiber bundle F to the liner L. The guide member 58 extends in the radial direction of the liner L (hereinafter, a radial direction), is movable in the radial direction, and rotatable about a rotational axis extending in the radial direction. A guide roller 55 is provided on the outer side of the nozzle unit 53 in the radial direction. The fiber bundle F pulled out from each bobbin 12 of the creel stand 3 (see FIG. 1) passes through the guide member 58 via the guide roller 55 and reaches the liner L.

The helical winding unit 50 includes a guide movement motor 56 and a guide rotation motor 57 (see FIG. 4). The guide movement motor 56 moves the guide members 58 of the respective nozzle units 53 altogether in the radial direction. The guide rotation motor 57 rotates the guide members 58 of the respective nozzle units 53 altogether about the respective rotational axes. The guide movement motor 56 and the guide rotation motor 57 are driven and controlled by the controller 10 (see FIG. 4). When the helical-winding is performed, the controller 10 causes the liner L to pass through the passing hole 54 while slowly rotating the liner L about the axis, by driving and controlling the supporting unit 30. Simultaneously, the controller 10 suit-ably moves the guide member 58 of each nozzle unit 53 in the radial direction (i.e., causes the guide member 58 to perform elongation or contraction) and rotates the guide member 58 about the rotational axis (i.e., causes the guide member 58 to perform rotation). As a result, the fiber bundle F is pulled out from the guide member 58 of each nozzle unit 53, and the fiber bundles F are simultaneously helical-wound onto the circumferential surface of the rotating liner L.

Fiber Bundle Retainer

Figure 6:
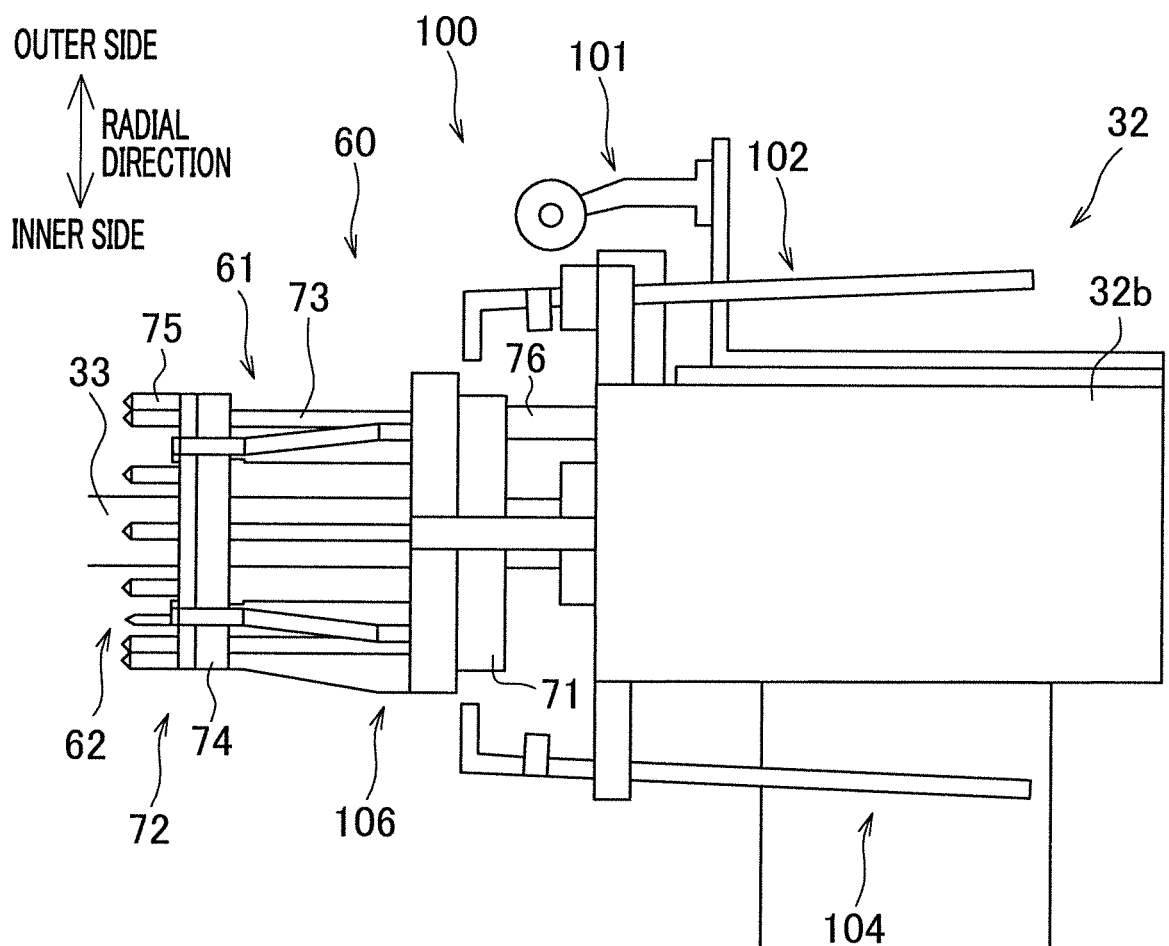
FIG. 6 is a profile of a second supporting unit including a fiber bundle retainer.
Figure 7A:
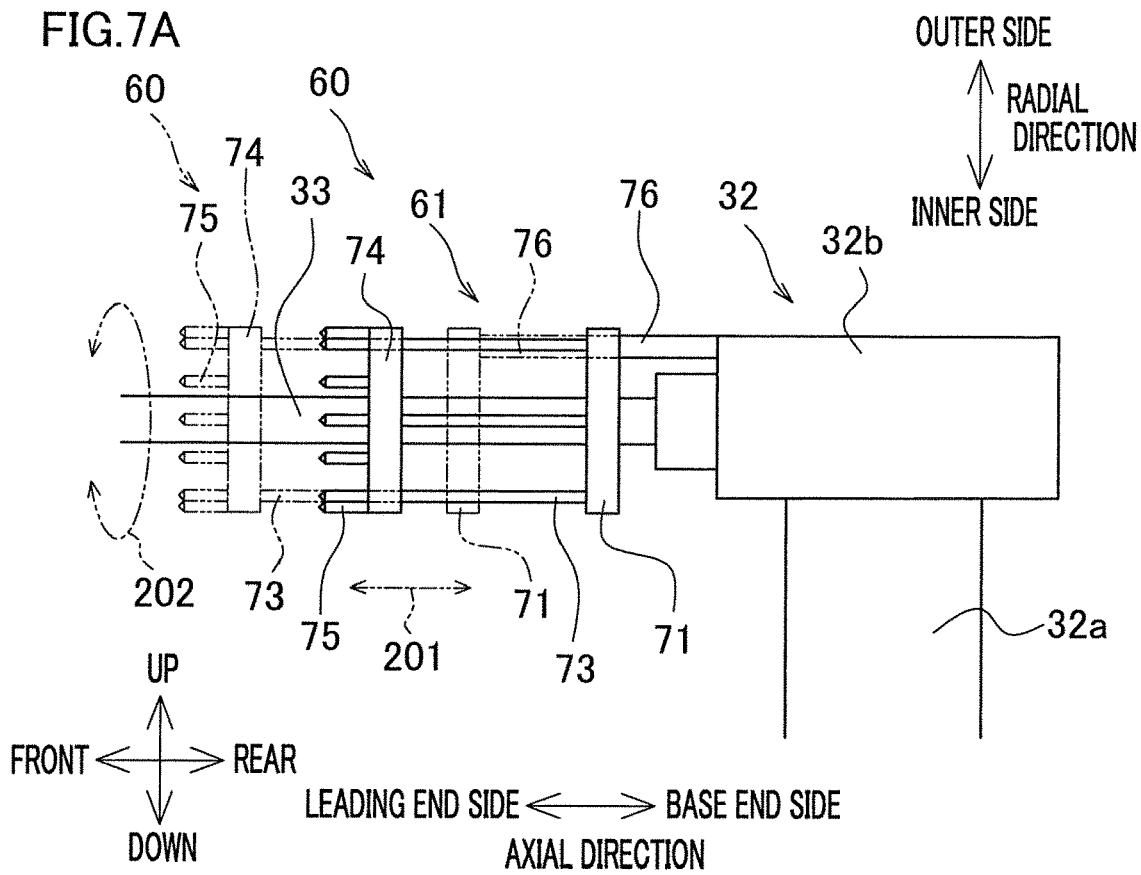
FIG. 7A is a profile of a reel member.
Figure 7B:
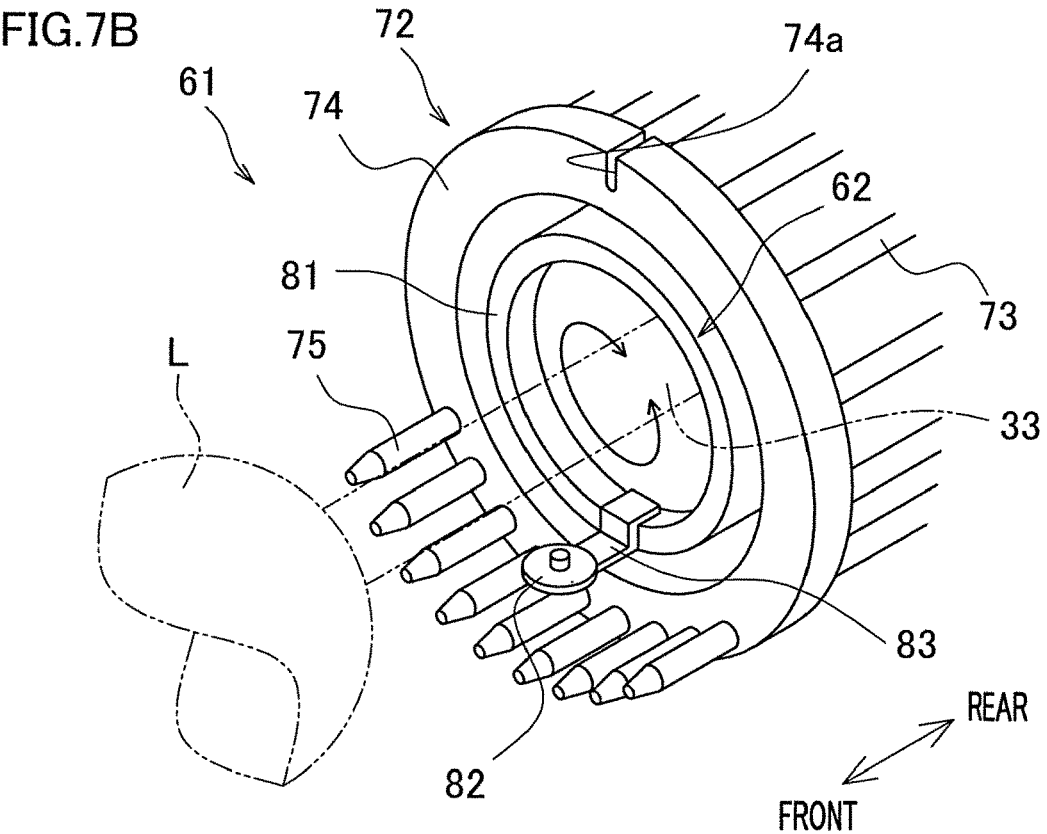
FIG. 7B is a perspective view of the reel member and a first cutting unit.

The following will describe the structure of the fiber bundle retainer 60 with reference to FIGS. 6, 7A and 7B. FIG. 6 is a profile of the second supporting unit 32 including the fiber bundle retainer 60. FIG. 7A is a profile of a later-described reel member 61. FIG. 7B is a perspective view of the reel member 61 and a later-described first cutting unit 62. FIGS. 7A and 7B do not show a later-described remaining yarn remover 100. Hereinafter, as shown in FIG. 6, the front side of the figure will be referred to as a leading end side in the axial direction (one side), whereas the rear side of the figure will be referred to as a base end side in the axial direction (the other side).

The fiber bundle retainer 60 is an apparatus that temporarily retains fiber bundles F when, for example, the liner L is replaced. In addition to this, the fiber bundle retainer 60 may temporarily retain fiber bundles F when a new liner L is supported by the supporting unit 30, for example. As shown in FIGS. 6, 7A and 7B, the fiber bundle retainer 60 includes the reel member 61 and the first cutting unit 62.

The reel member 61 is configured to be able to retain the fiber bundles F supplied through the guide members 58. The reel member 61 includes a base portion 71 and an outer peripheral portion 72. The base portion 71 is a ring-shaped member attached to a front end portion of the head portion 32b of the second supporting unit 32 and surrounds a supporting shaft 33 in the circumferential direction of the liner L. To the base portion 71, shaft members 73 are attached to be aligned in the circumferential direction of the liner L. The shaft members 73 extend toward the front side (leading end side in the axial direction).

The outer peripheral portion 72 is supported by the base portion 71 via the shaft members 73. The outer peripheral portion 72 includes a ring member 74 and pins 75. The ring member 74 is attached to the leading ends of the shaft members 73 and is provided to surround the supporting shaft 33 in the circumferential direction. On the outer circumferential surface of the ring member 74, a groove 74a is formed to extend in the axial direction of the liner L and extend inward in the radial direction of the liner L. (The reason of this arrangement will be described later.) The pins 75 are attached to an end face of the ring member 74 on the leading end side in the axial direction, and extend toward the leading end side in the axial direction. The pins 75 are provided at equal angular intervals in the circumferential direction of the liner L (hereinafter, circumferential direction).

As shown in FIG. 7A, the reel member 61 is movable in the axial direction relative to the head portion 32b by a movement mechanism 76 formed of, for example, a rack-and-pinion mechanism (see arrow 201 in FIG. 7A). The movement mechanism 76 is driven by a reel member movement motor 77 (see FIG. 4). The reel member 61 is rotationally driven by a reel member rotation motor 78 (see FIG. 4) about the supporting shaft 33 (i.e., about the axis of the liner L) (see arrow 202 in FIG. 7A). The reel member movement motor 77 and the reel member rotation motor 78 are driven and controlled by the controller 10 (see FIG. 4). With this arrangement, the reel member 61 is able to wind the fiber bundles F supplied through the guide members 58 onto the outer peripheral portion 72 (as detailed later).

The first cutting unit 62 is configured to cut parts of the fiber bundles F that are between parts wound onto the outer peripheral portion 72 of the reel member 61 and parts wound onto the liner L. As shown in FIG. 7B, the first cutting unit 62 includes a frame 81 and a cutter 82. The frame 81 is a hollow cylindrical member provided inside the ring member 74 in the radial direction of the liner L. The cutter 82 is, for example, a rotatable circular blade. The cutter 82 is rotatably supported by a supporting member 83 attached to a leading end portion in the axial direction of the frame 81. The cutter 82 is provided on the inner side of the pins 75 in the radial direction of the liner L. The frame 81 may not be hollow cylindrical in shape, and may be ring-shaped.

The frame 81 is movable in the axial direction relative to the reel member 61 by a first cutting unit movement motor 84 (see FIG. 4). The movement of the frame 81 in the axial direction is performed mainly to align the cutter 82. The frame 81 is rotatable about the supporting shaft 33 by a first cutting unit rotation motor 85 (see FIG. 4). The first cutting unit movement motor 84 and the first cutting unit rotation motor 85 are driven and controlled by the controller 10 (see FIG. 4). The cutter 82 is movable in the axial direction and rotatable about the supporting shaft 33 together with the frame 81 (see arrows in FIG. 7B). With this arrangement, the first cutting unit 62 is able to cut parts of the fiber bundles F that are between parts wound onto the outer peripheral portion 72 of the reel member 61 and parts wound onto the liner L, in the circumferential direction.

Operation of Members in Replacement of Liner

The following will describe operations of members such as the reel member 61 when the liner is replaced, with reference to FIGS. 8A to 8F. In FIGS. 8A to 8D, only the helical winding unit 50, the liner L, the reel member 61, the first cutting unit 62, and the fiber bundles F are schematically shown for simplicity.

Figure 8A:
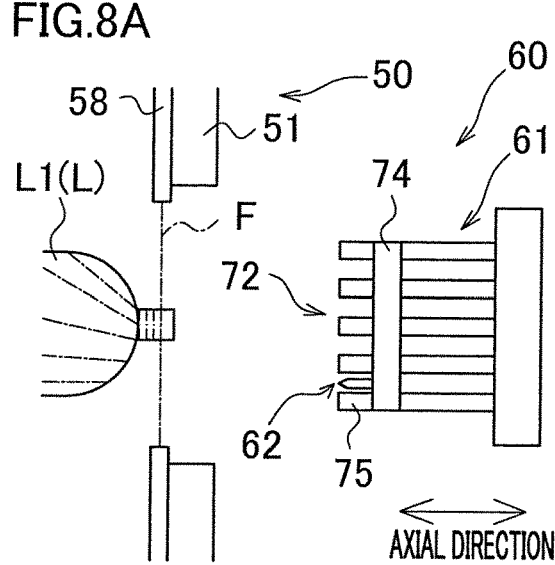
FIGS. 8A to 8F illustrate operations of members such as the reel member when a liner is replaced.
Figure 8B:
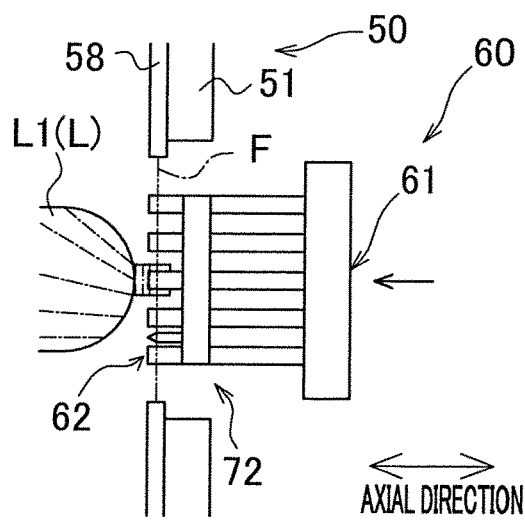
Figure 8C:
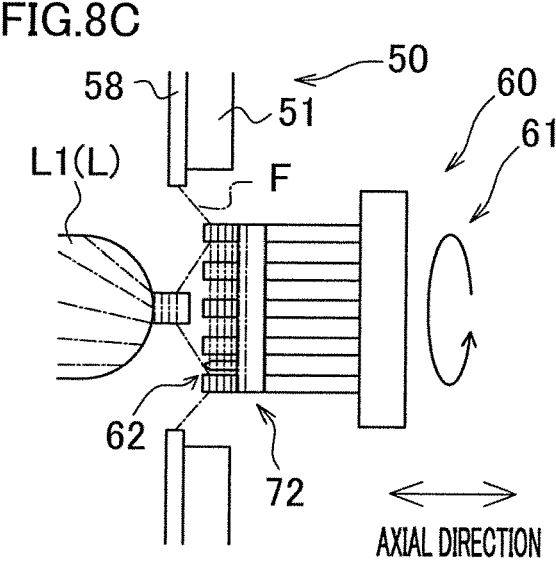
Figure 8D:
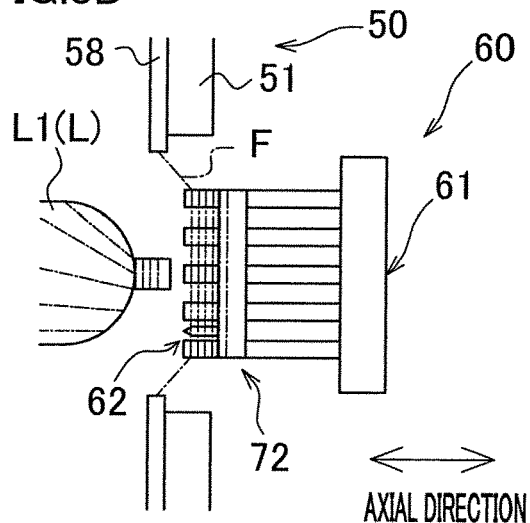
Figure 8E:
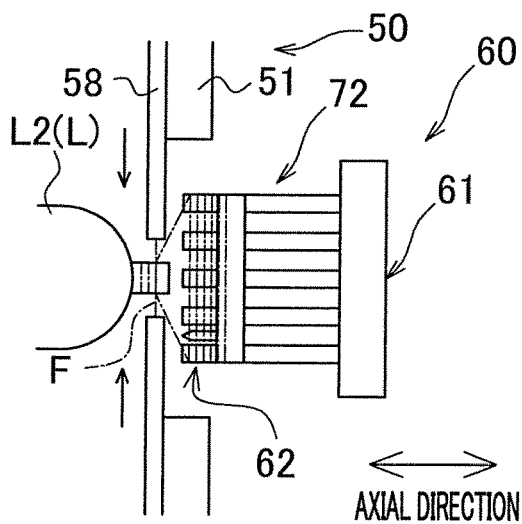

To begin, it is assumed that helical-winding on a liner L (liner L1) has been completed as shown in FIG. 8A. In this state, the controller 10 controls the reel member movement motor 77 (see FIG. 4) to move the reel member 61 toward the liner L1 in the axial direction (see FIG. 8B) and inserts the pins between the fiber bundles F in the circumferential direction. Thereafter, the controller 10 controls the reel member rotation motor 78 to rotate the reel member 61 about the axis of the liner L1 (see FIG. 8C). As a result, the fiber bundles F are wound onto the outer peripheral portion 72 of the reel member 61 and retained (see FIG. 8C).

Subsequently, the controller 10 controls the first cutting unit movement motor 84 (see FIG. 4) to position the cutter 82. The controller 10 then controls the first cutting unit rotation motor 85 (see FIG. 4) to rotate the cutter 82 about the axis of the liner L1. As a result, the fiber bundles F are cut in the circumferential direction. Specifically, as described above, parts of the fiber bundles F that are between parts wound onto the outer peripheral portion 72 of the reel member 61 and parts wound onto the liner L1 are cut (see FIG. 8D).

Subsequently, the operator detaches the liner L1 from the supporting unit 30 (see FIG. 2) and attaches a new liner L2 (see FIG. 8E) to the supporting unit 30 (liner replacement). Thereafter, the controller 10 controls the guide movement motor 56 (see FIG. 4) to move the guide members 58 inward in the radial direction. As a result, parts of the fiber bundles F that are between the parts wound onto the outer peripheral portion 72 and the guide members 58, become close to an end portion in the axial direction of the liner L2. Furthermore, the controller 10 controls the liner rotation motor 35 to rotate the liner L2 about the axis. As a result, the fiber bundles F are wound onto the end portion in the axial direction of the liner L2 (see FIG. 8E).

Last, the controller 10 controls the first cutting unit movement motor 84 (see FIG. 4) to position the cutter 82. The controller 10 then controls the first cutting unit rotation motor 85 (see FIG. 4) to rotate the cutter 82 about the axis of the liner L2. Consequently, parts of the fiber bundles F that are between parts wound onto the outer peripheral portion 72 of the reel member 61 and parts wound onto the liner L2, are cut (see FIG. 8F). The liner replacement is performed as described above. The above-described replacement may be automatically performed by a machine.

Figure 8F:
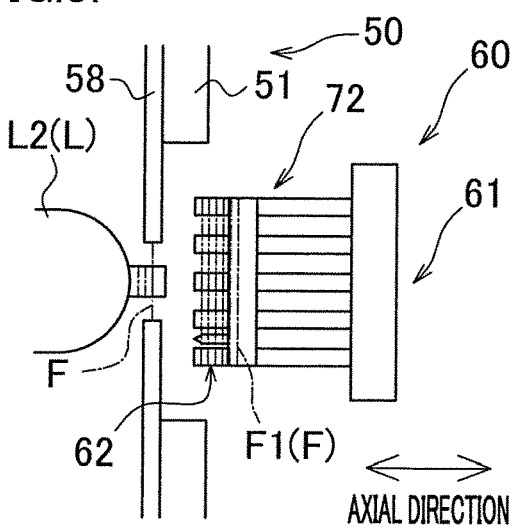

In connection with the above, as shown in FIG. 8F, part of the fiber bundles F remains wound onto the outer peripheral portion 72 of the reel member 61, as a remaining yarn F1. Such a remaining yarn F1 must be removed before the next liner replacement, for example. The removal of the remaining yarn F1 includes, for example, an operation to cut the remaining yarn F1 in the axial direction of the liner L. This operation has been troublesome because it is manually performed by an operator. In addition to the above, the fiber bundles wound onto the liner L are typically impregnated with adhesive resin. This makes the removal further troublesome because, for example, the remaining yarn F1 is adhered to the outer peripheral portion 72 of the reel member 61. To simplify removal of the remaining yarn F1, the fiber bundle retainer 60 of the example includes a remaining yarn remover 100 that is arranged as described below.

Remaining Yarn Removal Mechanism

Figure 9:
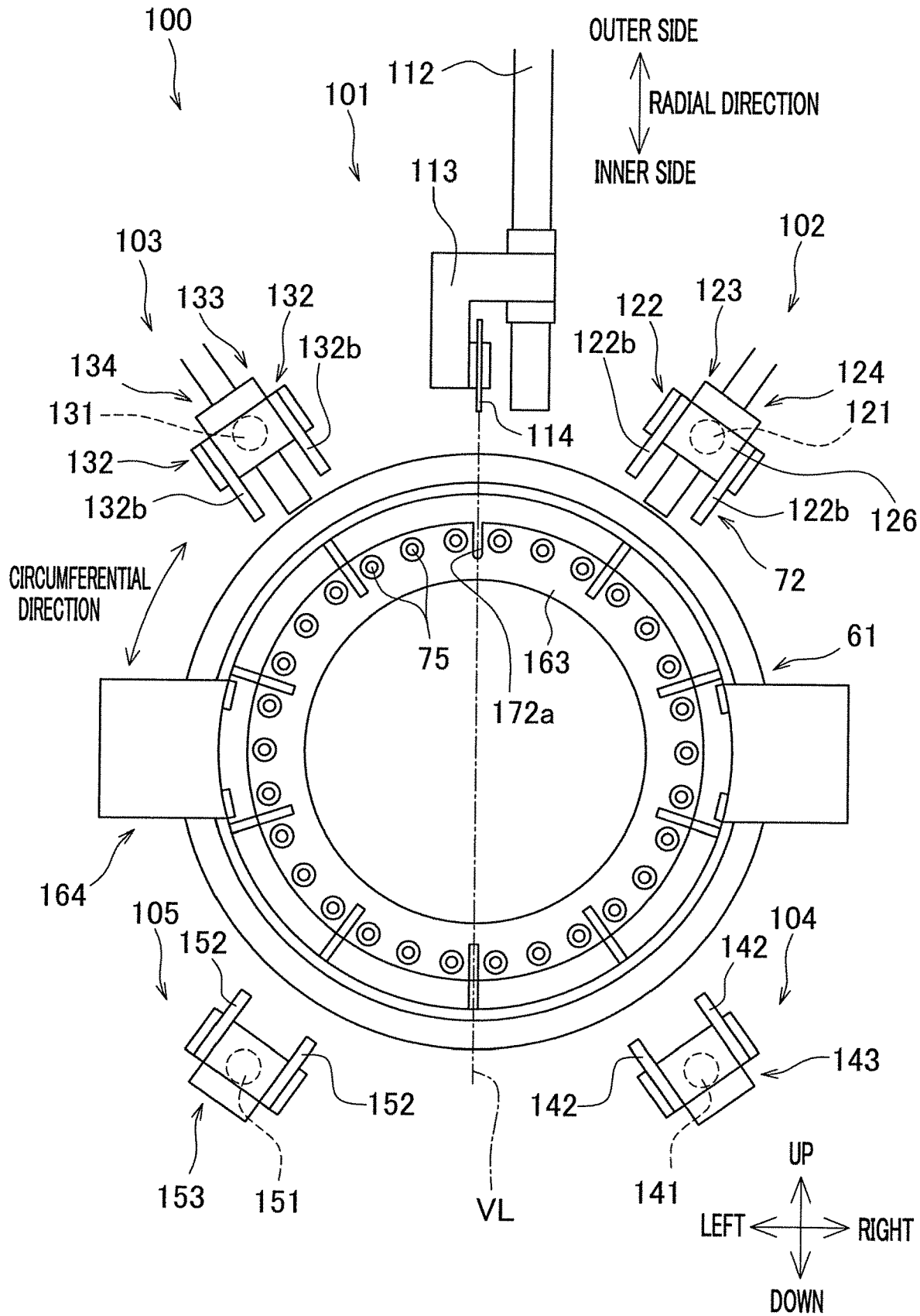
FIG. 9 is a front elevation of the fiber bundle retainer.

The following will describe the structure of the remaining yarn remover 100 with reference to FIGS. 6 and 9 to 13. FIG. 9 is a front elevation of the fiber bundle retainer 60 including the remaining yarn remover 100. The other figures will be described accordingly. The remaining yarn remover 100 is attached to the head portion 32b of the second supporting unit 32. As shown in FIGS. 6 and 9, the remaining yarn remover 100 includes a second cutting unit 101, a pair of first arm units 102 and 103, a pair of second arm units 104 and 105, and a remaining yarn peel-off unit 106. Each of the second cutting unit 101, the first arm units 102 and 103, the second arm units 104 and 105, and the remaining yarn peel-off unit 106 has a movable portion. In FIG. 6, all members of the remaining yarn remover 100 are at their initial positions.

Figure 10A:
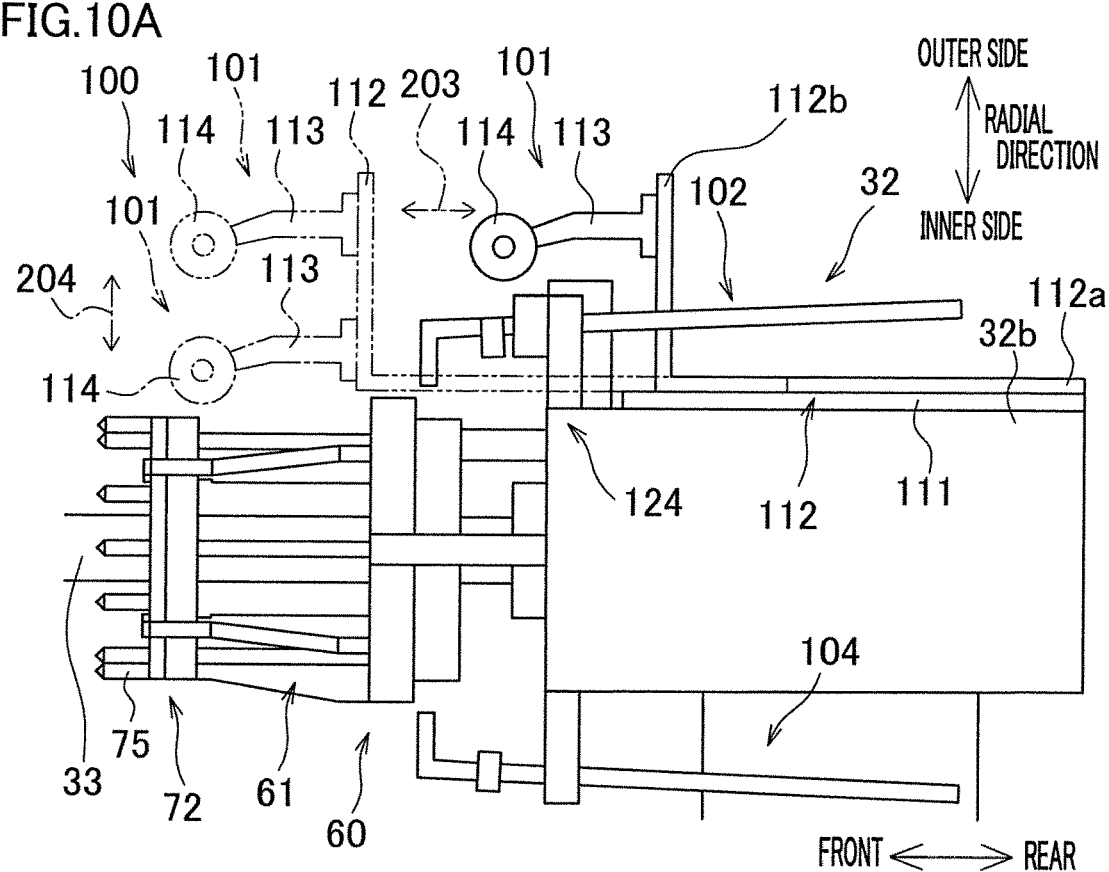
FIG. 10A shows the structure of a second cutting unit.

The following will describe the second cutting unit 101 with reference to FIGS. 9 and 10A. FIG. 10A illustrates the structure of the second cutting unit 101. The second cutting unit 101 is provided independently from the above-described first cutting unit 62. As discussed later, the second cutting unit 101 is arranged to cut the fiber bundles F wound onto the reel member 61 in the front-rear direction (axial direction). As shown in FIGS. 9 and 10A, the second cutting unit 101 is provided above the reel member 61. As shown in FIG. 10A, the second cutting unit 101 includes a rail member 111, a first movable member 112, a second movable member 113, and a cutter 114. Roughly speaking, the first movable member 112 moves in the axial direction along the rail member 111 fixed to the upper end portion of the head portion 32b of the second supporting unit 32. The second movable member 113 moves in the radial direction of the liner L along the front end portion of the first movable member 112. The cutter 114 attached to the leading end portion of the second movable member 113 to be rotatable cuts the fiber bundles F.

The rail member 111 is a member extending in the front-rear direction. The rail member 111 is fixed to the upper end portion of the head portion 32b of the second supporting unit 32. The rail member 111 supports the first movable member 112 to be movable in the front-rear direction (axial direction).

The first movable member 112 is substantially L-shaped. As shown in FIG. 10A, the first movable member 112 includes a bottom portion 112a extending in the front-rear direction and a front portion 112b extending upward from a front end portion of the bottom portion 112a. The bottom portion 112a of the first movable member 112 is supported by the rail member 111 to be movable in the front-rear direction. The front portion 112b supports the second movable member 113 to be movable in the up-down direction. The first movable member 112 is moved in the front-rear direction along the rail member 111 (see arrow 203 in FIG. 10A) by, for example, a second cutting unit movement motor 116 (see FIG. 4). The second cutting unit movement motor 116 is driven and controlled by the controller 10 (see FIG. 4).

The second movable member 113 is a member that extends substantially in the front-rear direction. The second movable member 113 is provided above the reel member 61 (see FIG. 9). The second movable member 113 is supported by the first movable member 112 to be movable in the up-down direction (in this example, this direction is identical to the radial direction of the liner L) (see arrow 204 in FIG. 10A). The cutter 114 is supported by the front end portion of the second movable member 113 to be rotatable. The second movable member 113 is moved in the up-down direction along the front portion 112b of the first movable member 112 by, for example, a second cutting unit vertical movement motor 117 (see FIG. 4). The second cutting unit vertical movement motor 117 is driven and controlled by the controller 10 (see FIG. 4).

The cutter 114 is provided to cut the remaining yarn F1 in the axial direction. The cutter 114 is, for example, a rotatable circular blade. The cutter 114 is supported by the front end portion of the second movable member 113 to be rotatable about a rotational axis direction which is parallel to the left-right direction. As shown in FIG. 9, when viewed in the front-rear direction (see FIG. 9), the cutter 114 is provided on a vertical line VL passing through the axial center of the reel member 61. The cutter 114 is rotationally driven by, for example, a cutter rotation motor 118 (see FIG. 4). The cutter rotation motor 118 is driven and controlled by the controller 10 (see FIG. 4).

In the second cutting unit 101 described above, as shown in FIG. 10A, the cutter 114 is movable in the front-rear direction (see arrow 203 and the second cutting unit 101 indicated by two-dot chain lines in FIG. 10A). The cutter 114 is movable in the up-down direction, too (see arrow 204 and the second cutting unit 101 indicated by one-dot chain lines in FIG. 10A).

As described above, the groove 74a is formed along the axial direction of the liner L in the outer circumferential surface of the ring member 74 of the reel member 61 (see FIG. 7B). The groove 74a extends inward in the radial direction of the liner L from the outer circumferential surface of the ring member 74. With this arrangement, when the groove 74a is positioned at the highest part of the ring member 74 (i.e., when the groove 74a is at the 12 o'clock position), the cutter 114 is allowed to enter the groove 74a. In other words, the cutter 114 is allowed to move further inward in the radial direction.

Figure 10B:
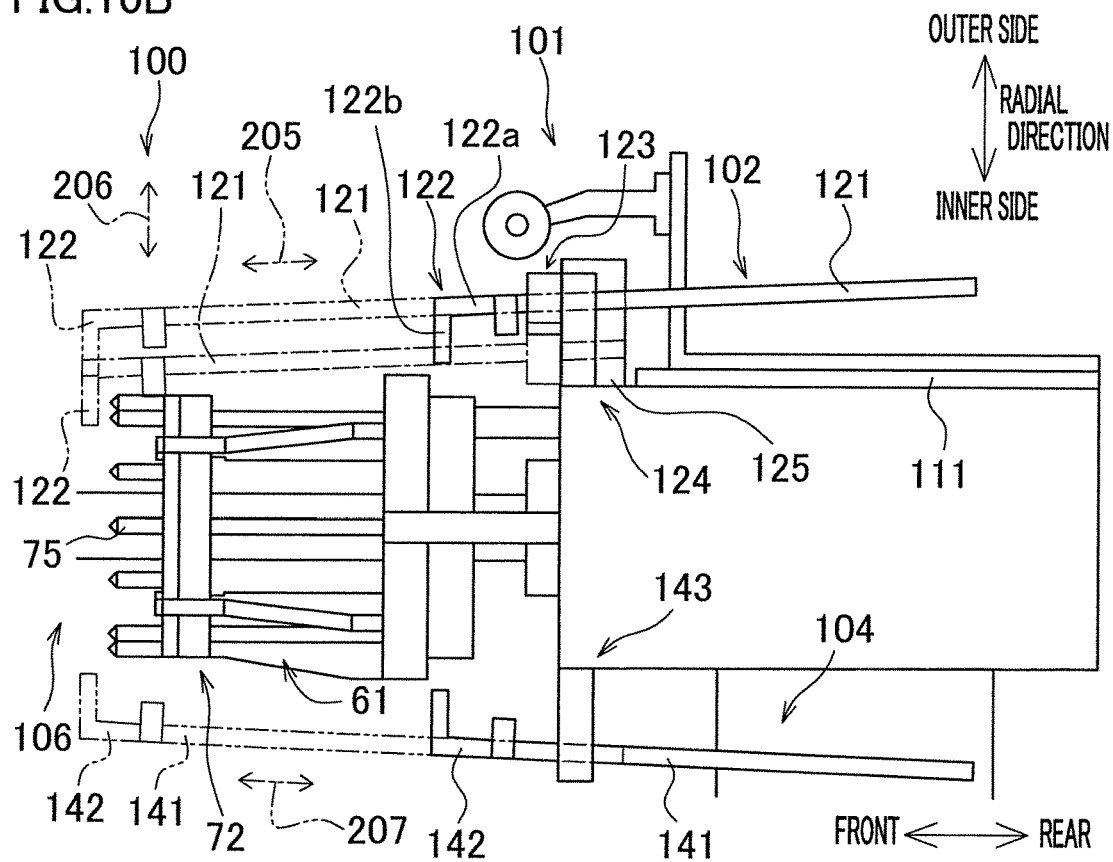
FIG. 10B shows the structure of a first arm unit and a second arm unit.

The following will describe the first arm units 102 and 103 with reference to FIGS. 9 and 10B. FIG. 10B illustrates the structures of the first arm units 102 and 103 and the second arm units 104 and 105. The first arm units 102 and 103 are provided mainly to suppress the remaining yarn F1 from slipping forward when the remaining yarn F1 is cut by the second cutting unit 101. As shown in FIG. 9, the first arm units 102 and 103 are provided above the reel member 61, for example. The first arm units 102 and 103 are provided on the respective sides of the second cutting unit 101 in the left-right direction (i.e., in the rotational axis direction of the cutter 114). The first arm unit 102 is provided to the right of the second cutting unit 101. The first arm unit 103 is provided to the left of the second cutting unit 101. The first arm unit 102 and the first arm unit 103 are substantially symmetrical in the left-right direction.

As shown in FIGS. 9 and 10B, the first arm unit 102 includes members such as an arm member 121, a pressing member 122 (fiber bundle pressing member), a first movement mechanism 123, and a second movement mechanism 124. Roughly speaking, the arm member 121 is movable in the longitudinal direction of the arm member 121 by the first movement mechanism 123 and is movable in the radial direction of the liner L by the second movement mechanism 124. The pressing member 122 attached to a front end portion of the arm member 121 restricts the movement of the remaining yarn F1 in the axial direction.

The arm member 121 is a rod-shaped member extending substantially in the front-rear direction. To be more precise, the arm member 121 is inclined forward and inward in the radial direction of the liner L. The arm member 121 is supported in a movable manner by a supporting member 125 fixed to an upper portion of the head portion 32b of the second supporting unit 32, via the first movement mechanism 123 and the second movement mechanism 124. An attaching member 126 is attached to the front end portion of the arm member 121. The attaching member 126 is, for example, a plate-shaped member. As shown in FIG. 9, the attaching member 126 extends at least in the circumferential direction of the liner L.

The pressing member 122 is substantially L-shaped. As shown in FIG. 10B, the pressing member 122 includes a main body portion 122a extending substantially in the front-rear direction and a claw portion 122b extending substantially in the radial direction of the liner L from a front end portion of the main body portion 122a. At the end portions of the attaching member 126 in the circumferential direction of the liner L, two pressing members 122 are attached, respectively.

The first movement mechanism 123 is a mechanism configured to move the arm member 121 in the longitudinal direction of the arm member 121. The first movement mechanism 123 is, for example, a known rack-and-pinion mechanism. The first movement mechanism 123 is supported by the second movement mechanism 124 to be movable in the radial direction of the liner L. The first movement mechanism 123 is driven by a first arm telescopic movement motor 127 (see FIG. 4). The first arm telescopic movement motor 127 is driven and controlled by the controller 10 (see FIG. 4). With this arrangement, the arm member 121 moves in the longitudinal direction of the arm member 121 (see arrow 205 and arm member 121 indicated by two-dot chain lines in FIG. 10B).

The second movement mechanism 124 is a mechanism configured to move the arm member 121 in the radial direction of the liner L. The second movement mechanism 124 is, for example, a known ball screw mechanism. The second movement mechanism 124 is attached to the supporting member 125. The second movement mechanism 124 supports the first movement mechanism 123 so that the first movement mechanism 123 is movable in the radial direction of the liner L. The second movement mechanism 124 is driven by a first arm movement motor 128 (see FIG. 4). The first arm movement motor 128 is driven and controlled by the controller 10 (see FIG. 4). With this arrangement, the arm member 121 moves in the radial direction of the liner L, together with the first movement mechanism 123 (see arrow 206 and arm member 121 indicated by one-dot chain lines in FIG. 10B).

Being similar to the first arm unit 102, the first arm unit 103 includes members such as an arm member 131, a pressing member 132 (fiber bundle pressing member), a first movement mechanism 133, and a second movement mechanism 134 (see FIG. 9). The pressing member 132 includes a claw portion 132b. The first movement mechanism 133 of the first arm unit 103 is driven by a first arm telescopic movement motor 137 (see FIG. 4) that is different from the first arm telescopic movement motor 127. Similarly, the second movement mechanism 134 of the first arm unit 103 is driven by a first arm movement motor 138 (see FIG. 4) that is different from the first arm movement motor 128.

The following will describe the second arm units 104 and 105 with reference to FIGS. 9 and 10B again. The second arm units 104 and 105 are provided to receive the remaining yarn F1 peeled off from the reel member 61. As shown in FIG. 9, the second arm units 104 and 105 are provided below the reel member 61. The second arm unit 104 and the second arm unit 105 are substantially symmetrical in the left-right direction.

As shown in FIGS. 9 and 10B, the second arm unit 104 includes an arm member 141, a receiver 142, and a movement mechanism 143. The arm member 141 is, for example, a member similar to the arm member 121 of the first arm unit 102. The receiver 142 is, for example, a member similar to the pressing member 122 of the first arm unit 102. The movement mechanism 143 is, for example, a mechanism similar to the first movement mechanism 123 of the first arm unit 102. The movement mechanism 143 is driven by a second arm telescopic movement motor 144 (see FIG. 4). The second arm telescopic movement motor 144 is driven and controlled by the controller 10 (see FIG. 4). With this arrangement, the arm member 141 moves in the longitudinal direction of the arm member 141 (see arrow 207 and arm member 141 indicated by two-dot chain lines in FIG. 10B). Similarly, the second arm unit 105 includes an arm member 151, a receiver 152, and a movement mechanism 153 (see FIG. 9). The movement mechanism 153 is driven by a second arm telescopic movement motor 154 (see FIG. 4).

Figure 11:
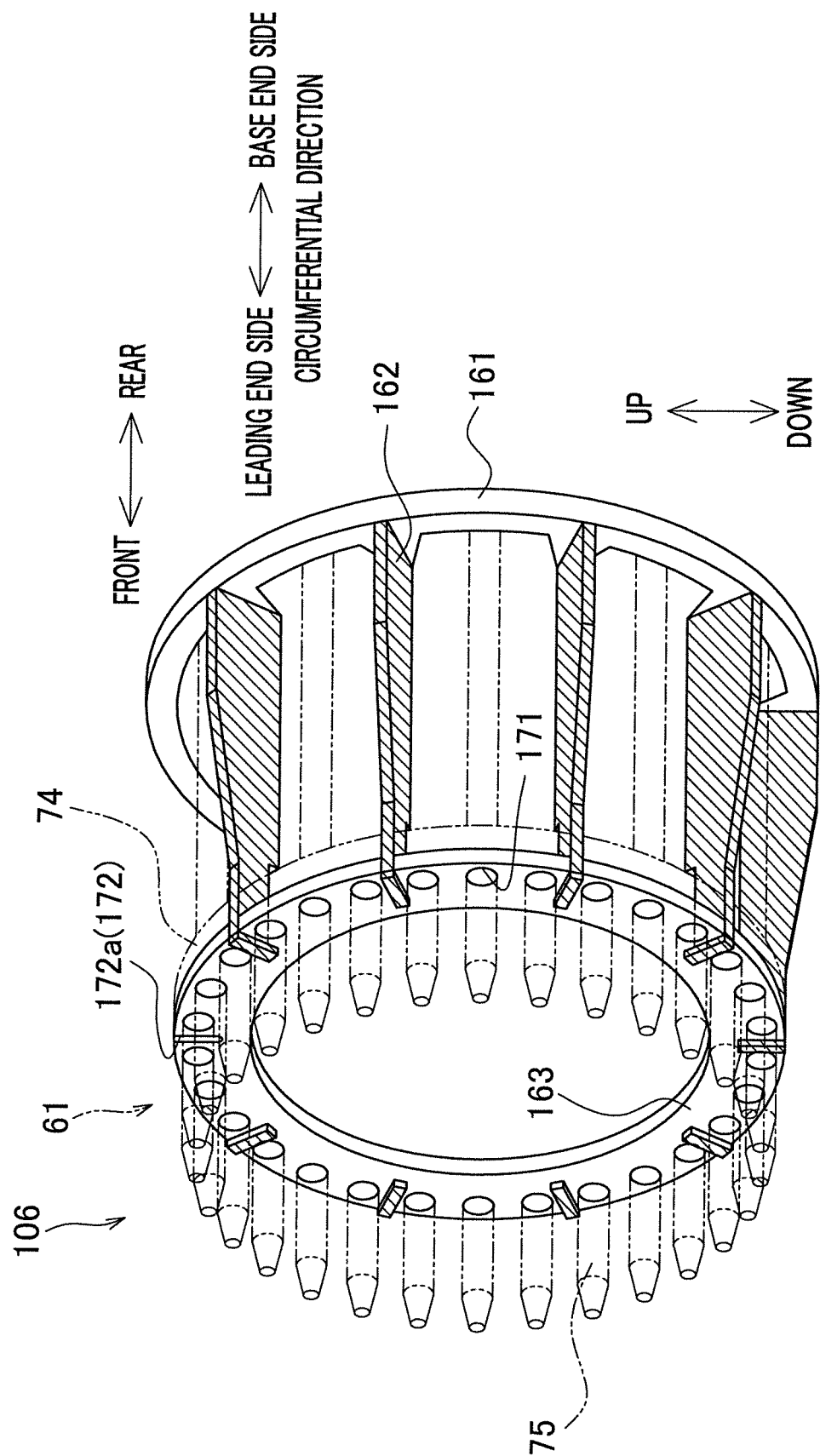
FIG. 11 shows the structure of a remaining yarn peel-off unit.
Figure 12A:
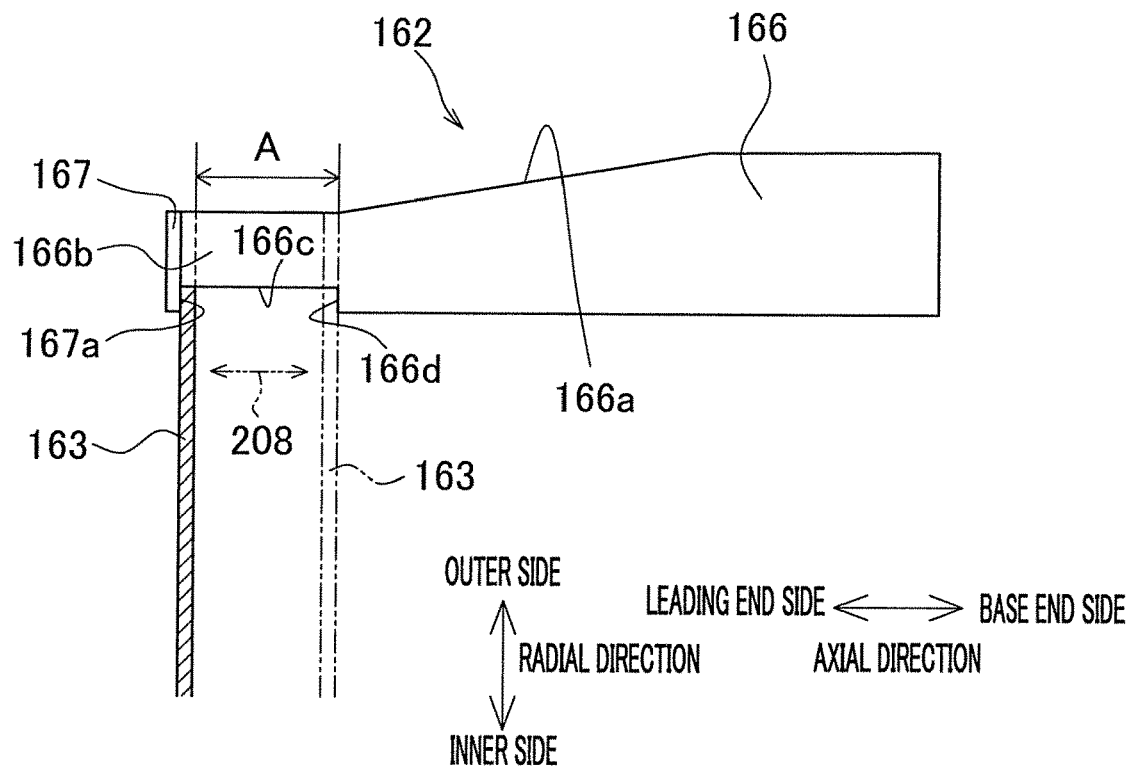
Figure 12B:
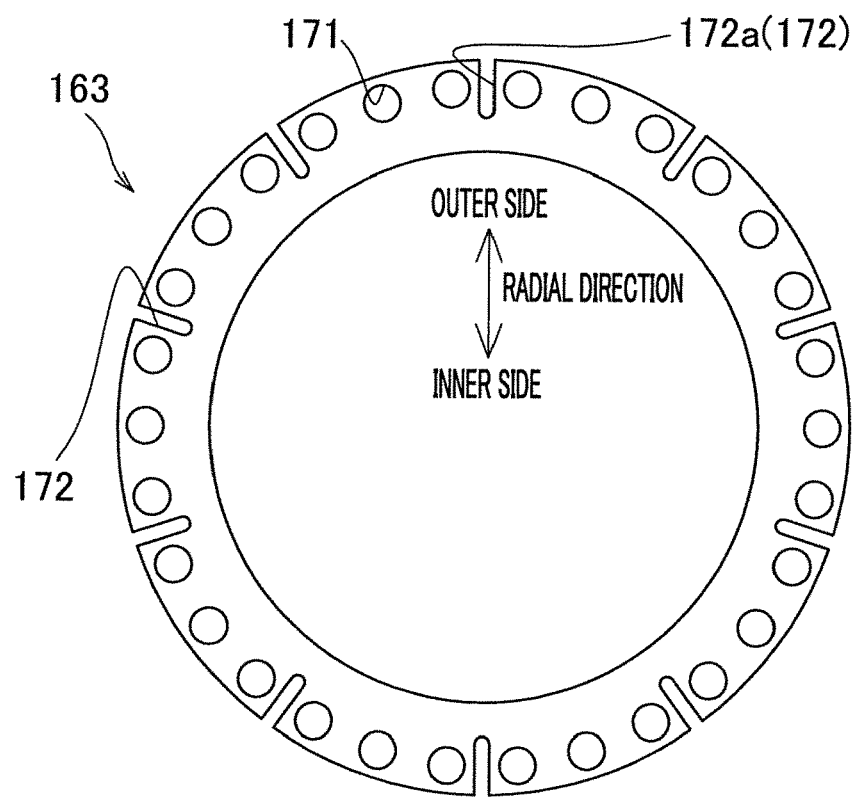
FIG. 12B shows a second peel-off portion.
Figure 13:
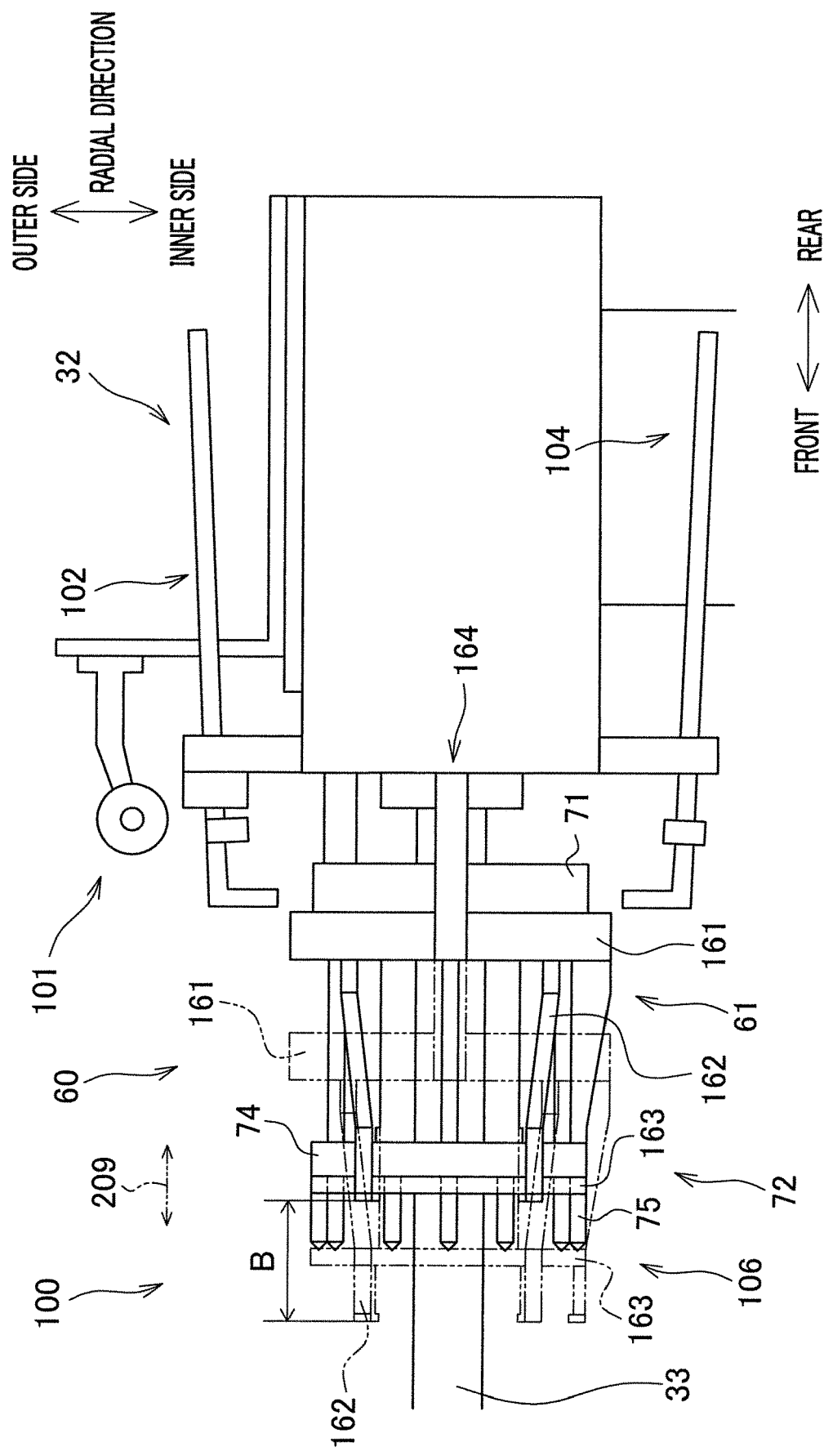
FIG. 13 shows the traveling range of the remaining yarn peel-off unit.

The following will describe the remaining yarn peel-off unit 106 mainly with reference to FIGS. 11 to 13. FIG. 11 shows the structure of the remaining yarn peel-off unit 106. In FIG. 11, the remaining yarn peel-off unit 106 is indicated by full lines whereas the reel member 61 is indicated by two-dot chain lines. FIG. 12A illustrates a later-described first peel-off portion 162. FIG. 12B illustrates a later-described second peel-off portion 163. FIG. 13 shows the traveling range of the remaining yarn peel-off unit 106. The profiles such as FIG. 13 only show some of later-described first peel-off portions 162 for the sake of simplicity.

The remaining yarn peel-off unit 106 is provided to facilitate the removal of the remaining yarn F1 adhered to the outer peripheral portion 72 of the reel member 61 and the remaining yarn F1 entwined around the pins 75, after the remaining yarn F1 is cut by the second cutting unit 101. As shown in FIGS. 6 and 11, the remaining yarn peel-off unit 106 is attached to the reel member 61. As shown in FIG. 11, the remaining yarn peel-off unit 106 includes a base portion 161, first peel-off portions 162, and a second peel-off portion 163. To improve the visi-bility, the first peel-off portions 162 are hatched in FIG. 11. Roughly speaking, the remaining yarn peel-off unit 106 moves toward the leading end side in the axial direction of the liner L to lift up the remaining yarn F1 from the outer peripheral portion 72 of the reel member 61 outward in the radial direction by the first peel-off portions 162 and to push out the remaining yarn F1 toward the leading end side in the axial direction by the second peel-off portion 163.

The base portion 161 is formed of, for example, a ring-shaped member. The base portion 161 is provided to surround the reel member 61 in the circumferential direction (i.e., to surround the above-described supporting shaft 33). The base portion 161 is provided in front of the base portion 71 of the reel member 61 (see FIG. 13). Plural first peel-off portions 162 are attached to the front end face of the base portion 161. The base portion 161 is movable in the axial direction of the liner L by a movement mechanism 164 that is formed of, for example, a rack-and-pinion mechanism. The movement mechanism 164 is driven by a remaining yarn peel-off unit movement motor 165 (see FIG. 4). The remaining yarn peel-off unit movement motor 165 is driven and controlled by the controller 10 (see FIG. 4).

The first peel-off portion 162 is a rod-shaped member extending in the axial direction of the liner L. As shown in FIG. 11, the first peel-off portions 162 are fixed to the front end face of the base portion 161 and movable in the axial direction together with the base portion 161. Nine first peel-off portions 162 are aligned in the circumferential direction of the liner L. The angular intervals of the first peel-off portions 162 in the circumferential direction are identical except at one interval. On the base portion 161, no first peel-off portion 162 is attached to the uppermost part (i.e., the 12 o'clock position). Said differently, the first peel-off portions 162 are provided not to interfere with the cutter 114 when the remaining yarn F1 is cut by the above-described second cutting unit 101 (see, e.g., FIG. 6). At the leading end portions of the first peel-off portions 162 in the axial direction, the second peel-off portion 163 is supported to be movable in the axial direction relative to the first peel-off portions 162.

The following will detail the first peel-off portions 162. As shown in FIG. 12A, each first peel-off portion 162 includes a main body 166 and a leading end member 167 fixed to the tip of the main body 166 in the axial direction. The main body 166 has an inclined surface 166a (contact surface). The inclined surface 166a is provided to make contact with the remaining yarn F1 from the inner side in the radial direction of the liner L to push the remaining yarn F1 outward in the radial direction. The inclined surface 166a is inclined outward in the radial direction of the liner L toward the base end side in the axial direction of the liner L. The inclined surface 166a is at least partially outside the outer peripheral portion 72 of the reel member 61 in the radial direction.

At a part of the main body 166 on the leading end side in the axial direction, a supporter 166b is provided to support the second peel-off portion 163 so that the second peel-off portion 163 is movable in the axial direction. This arrangement will be specifically described below. At a part of the main body 166, which is on the leading end side in the axial direction and is on the inner side in the radial direction, a cutout is formed by a face 166c that is orthogonal to the radial direction and a face 166d that is orthogonal to the axial direction and is connected to a side on the base end side in the axial direction of the face 166c. In the axial direction, a part of the main body 166 where the cutout is formed is the supporter 166b. The supporter 166b is fitted into a later-described groove 172 of the second peel-off portion 163 to be movable. The face 166d restricts the movement of the second peel-off portion 163 toward the base end side in the axial direction. Hereinafter, the face 166d will be referred to as a first regulating surface 166d (first regulatory portion).

The leading end member 167 protrudes inward in the radial direction relative to the supporter 166b. An end face on the base end side in the axial direction of the leading end member 167 is therefore partially exposed. This exposed portion will be referred to as a second regulating surface 167a (second regulatory portion). The second regulating surface 167a restricts the movement of the second peel-off portion 163 toward the leading end side in the axial direction.

The following will describe the second peel-off portion 163 with reference to FIGS. 11 and 12B. The second peel-off portion 163 is provided to mainly push the remaining yarn F1 entwined around the pins 75 toward the leading end side in the axial direction of the liner L. As shown in FIG. 11, the second peel-off portion 163 is formed of a ring-shaped member. The second peel-off portion 163 is provided to surround the above-described supporting shaft 33 in the circumferential direction of the liner L. The second peel-off portion 163 has plural through holes 171 (through holes) penetrating the portion in the axial direction. Each through hole 171 has an inner diameter slightly longer than the diameter of the pin 75 described above. It is therefore possible to insert the pin 75 into the through hole 171. When the second peel-off portion 163 is at an initial position (hereinafter, the initial position of the second peel-off portion 163 will be referred to as a retracted position), the pin 75 is inserted into each through hole 171. In the outer circumferential surface of the second peel-off portion 163, grooves 172 are formed to extend inward in the radial direction of the liner L. The position of one (groove 172a shown in FIG. 12B) of the grooves 172 in the circumferential direction corresponds to the position of the above-described groove 74a of the ring member 74 of the reel member 61 in the circumferential direction. Into the remaining grooves 172, the above-described supporters 166b of the first peel-off portion 162 are fitted. With this arrangement, the second peel-off portion 163 is supported by the first peel-off portions 162 aligned in the circumferential direction to be movable in the axial direction relative to the first peel-off portions 162.

The following will describe the movable range of the second peel-off portion 163. As shown in FIG. 12A, the second peel-off portion 163 is arranged to be movable relative to the first peel-off portions 162 within a range in which the supporters 166b of the first peel-off portions 162 are provided in the axial direction (see arrow 208 in FIG. 12A). The movement of the second peel-off portion 163 toward the base end side in the axial direction is restricted by the first regulating surface 166d of the first peel-off portion 162 and the movement of the second peel-off portion 163 toward the leading end side in the axial direction is restricted by the second regulating surface 167a. With this arrangement, the second peel-off portion 163 is movable in the axial direction relative to the first peel-off portions 162 by the distance A. When the remaining yarn peel-off unit 106 is at the initial position, the second peel-off portion 163 is separated from the first regulating surface 166d and in contact with the second regulating surface 167a (see, e.g., full lines in FIG. 12A).

As shown in FIG. 13, the base portion 161 and the first peel-off portions 162 are movable between a predetermined standby position (see full lines in FIG. 13) and a protruding position (contact position; indicated by two-dot chain lines in FIG. 13) which is on the front side (leading end side in the axial direction) of the standby position (see arrow 209 in FIG. 13). In the axial direction, the distance B that is the movable distance of the first peel-off portions 162 (i.e., the distance between the standby position and the protruding position in the axial direction shown in FIG. 13) is longer than the above-described distance A. Said differently, the distance A is shorter than the distance B. The operation of the remaining yarn peel-off unit 106 will be further detailed later.

Operation of Remaining Yarn Remover

Figure 14A:
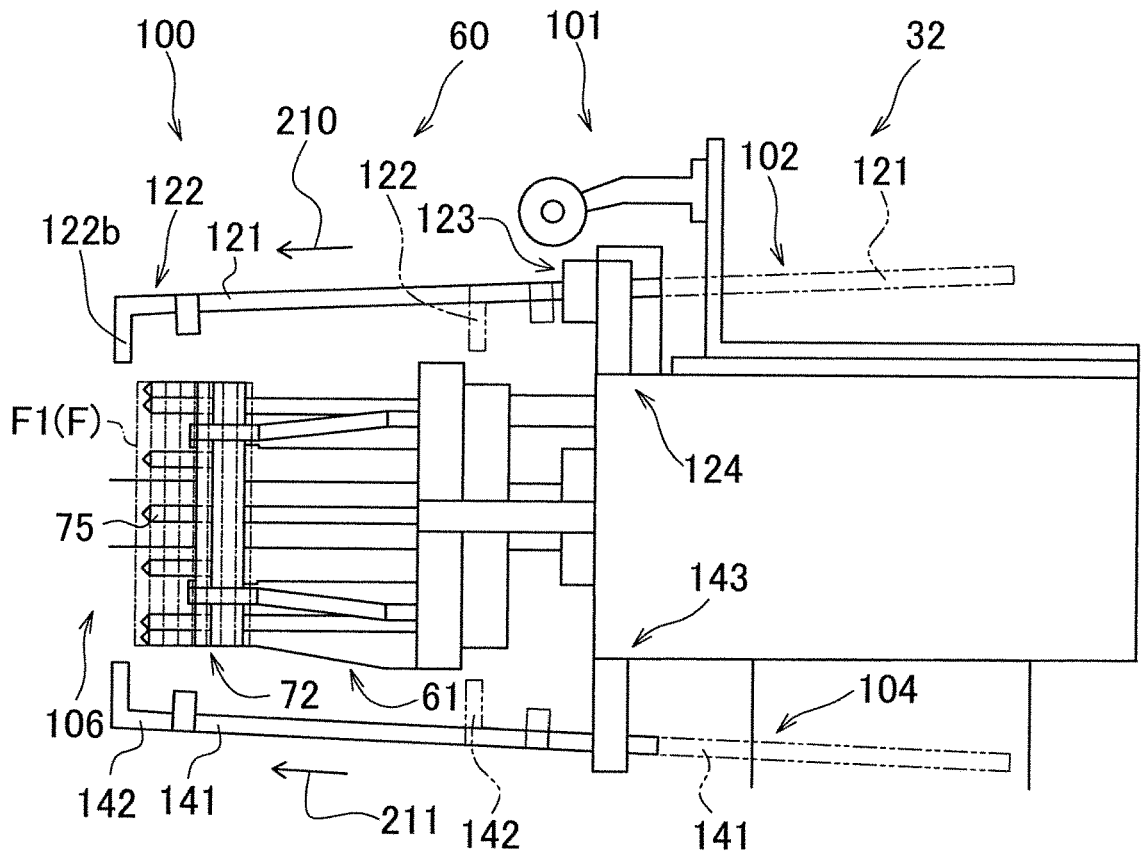
FIGS. 14A and 14B show operations of the first arm unit and the second arm unit.
Figure 14B:
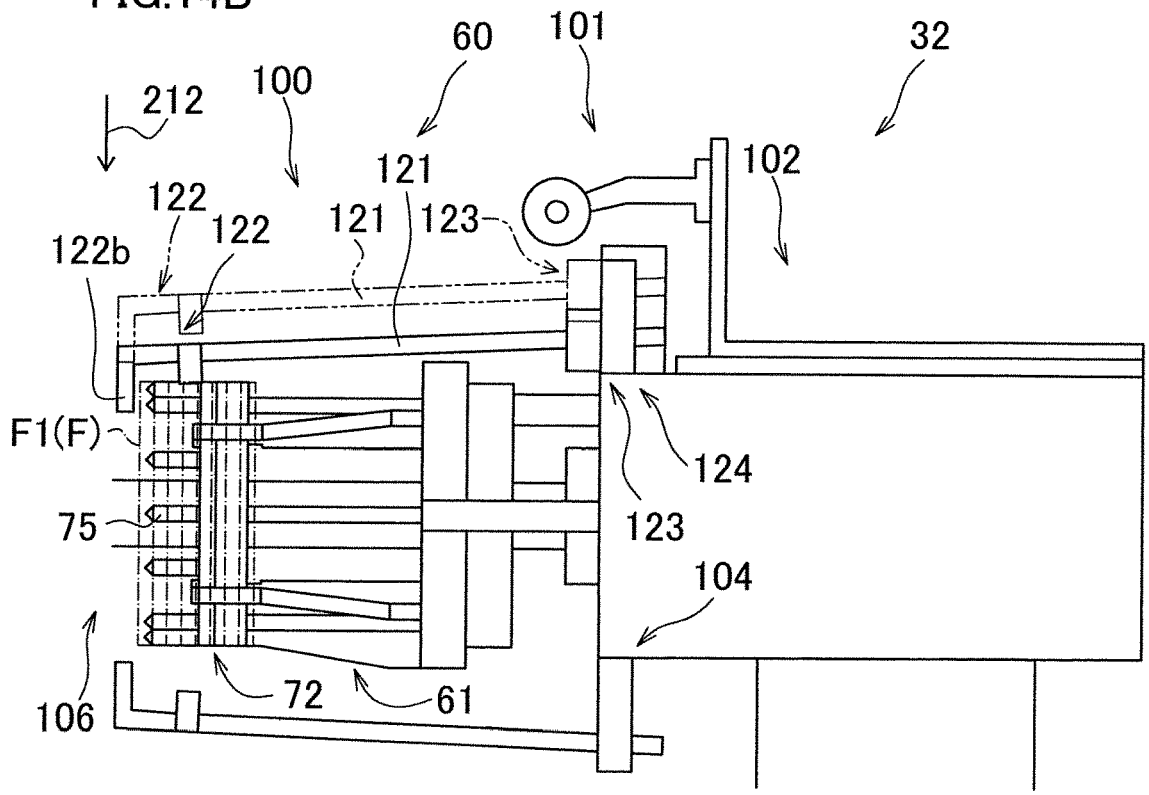
Figure 15:
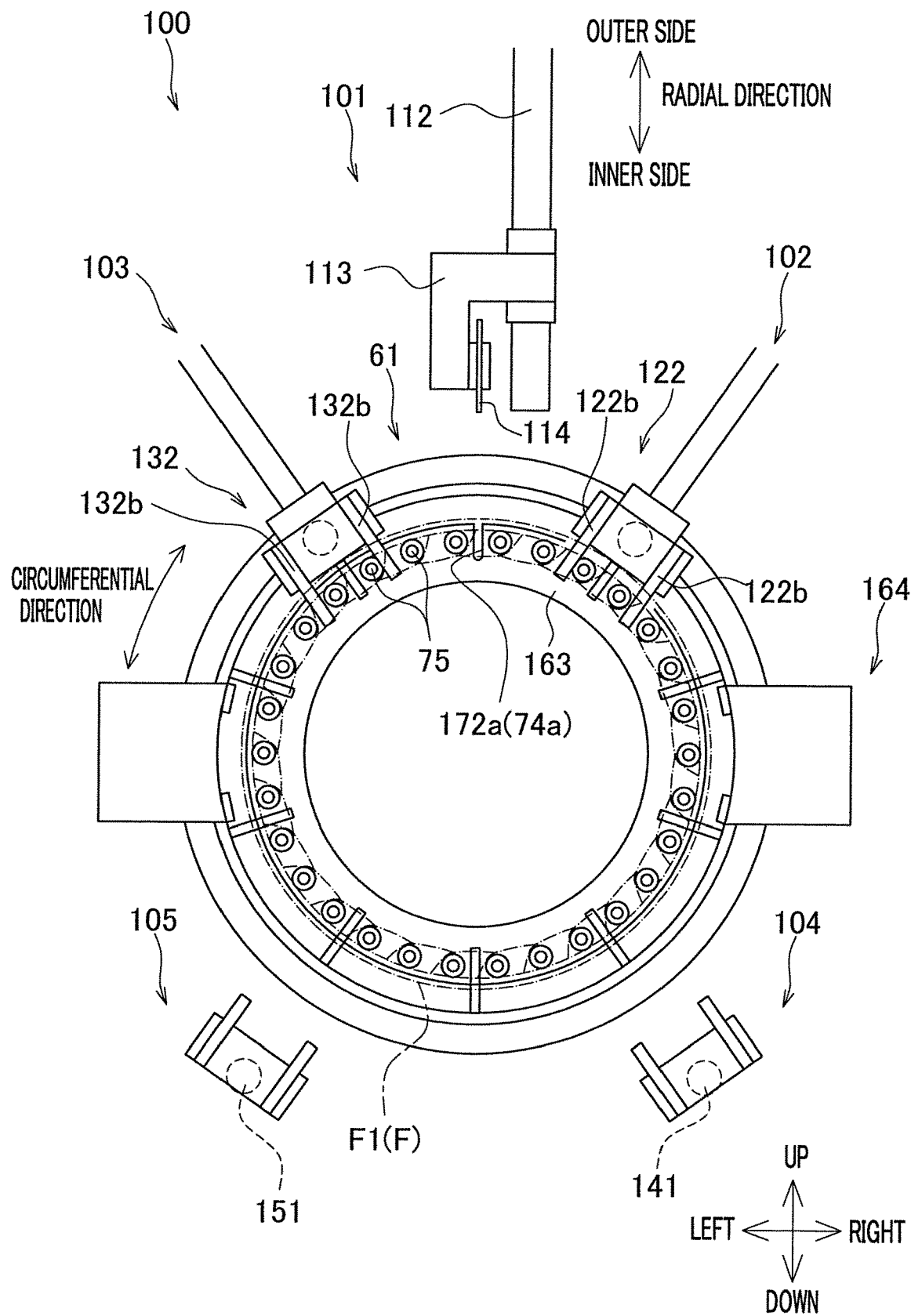
FIG. 15 illustrates the position of a pressing member.
Figure 16A:
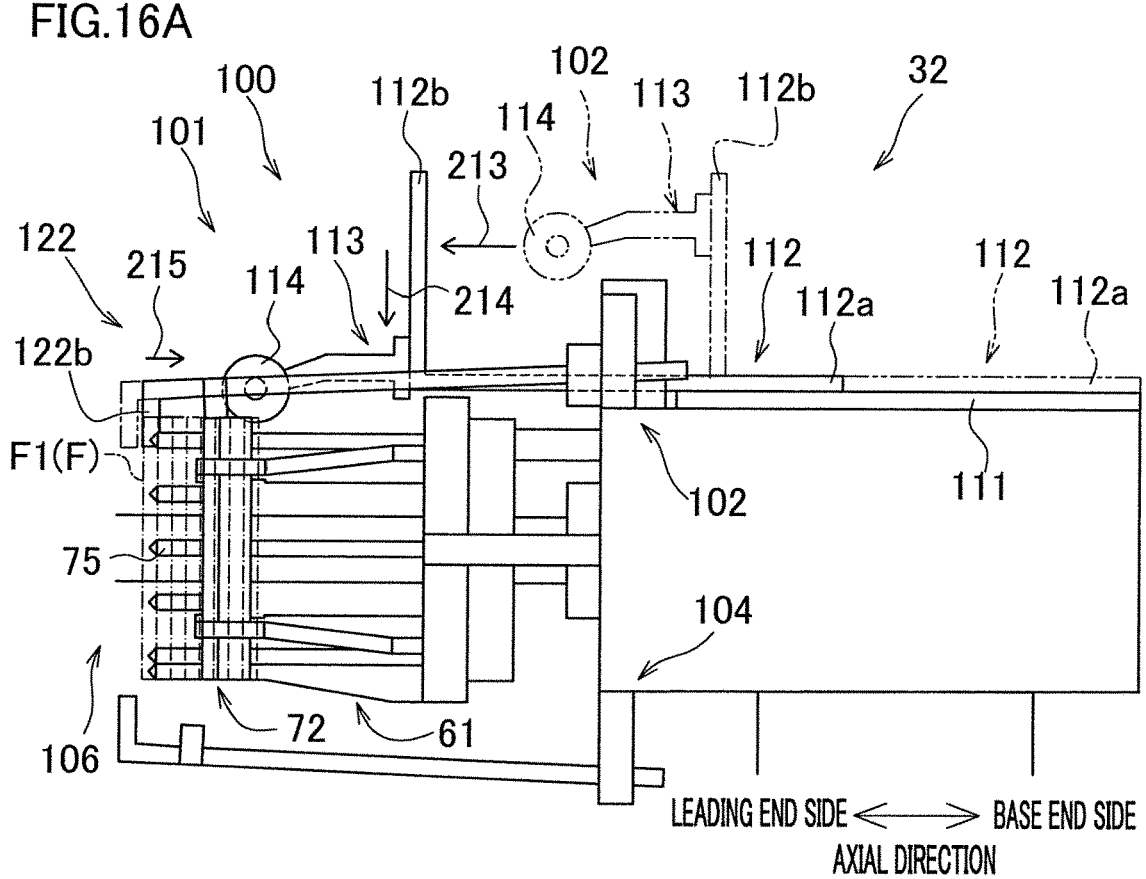
FIGS. 16A and 16B show operations of the first arm unit and the second cutting unit.
Figure 16B:
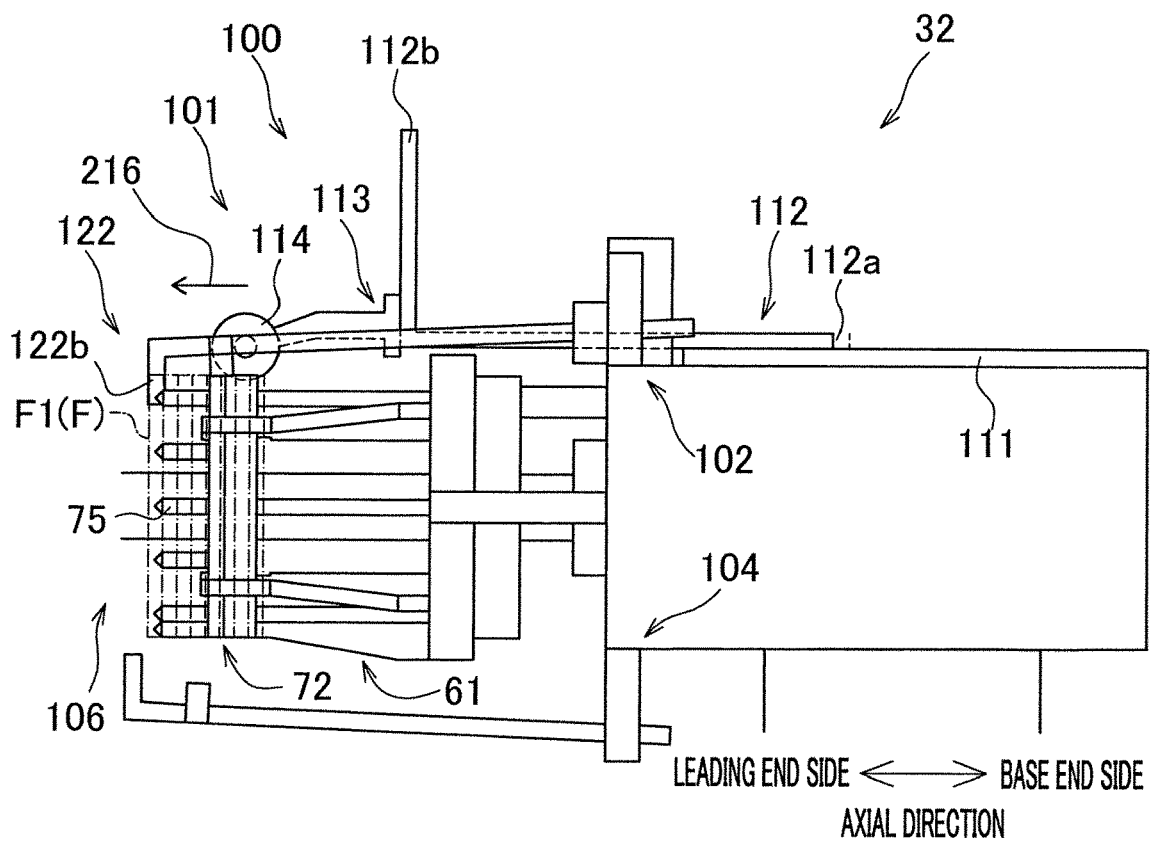
Figure 17:
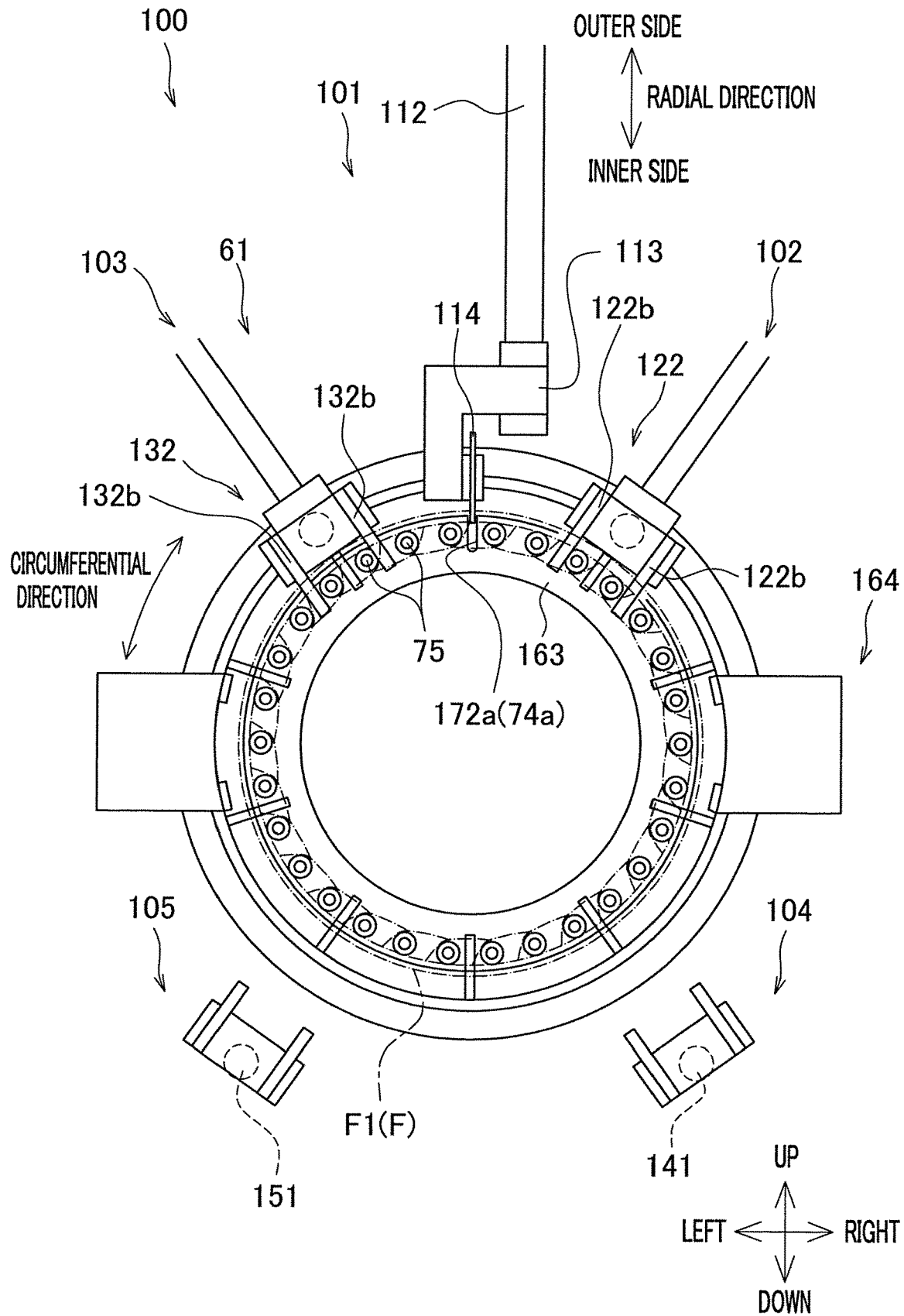
FIG. 17 shows the positions of the pressing member and a cutter.
Figure 18:
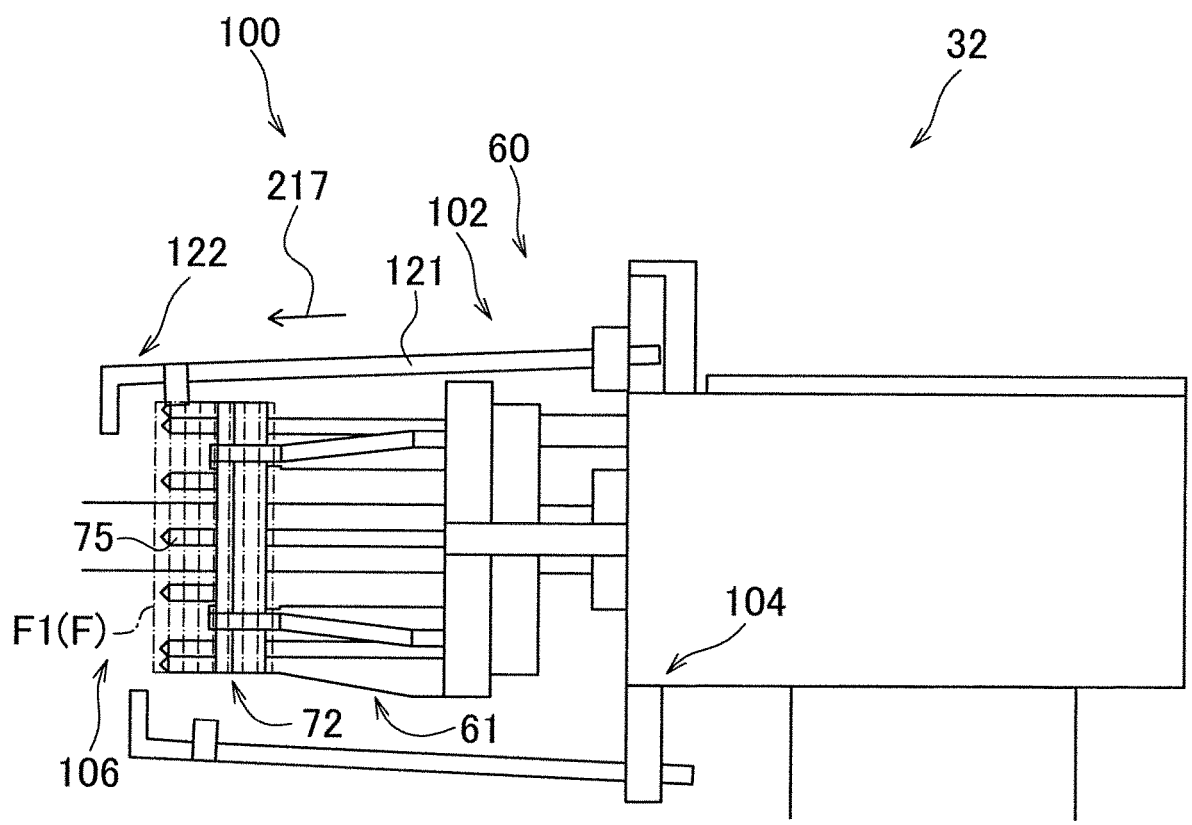
FIG. 18 shows an operation of the first arm unit.
Figure 19A:
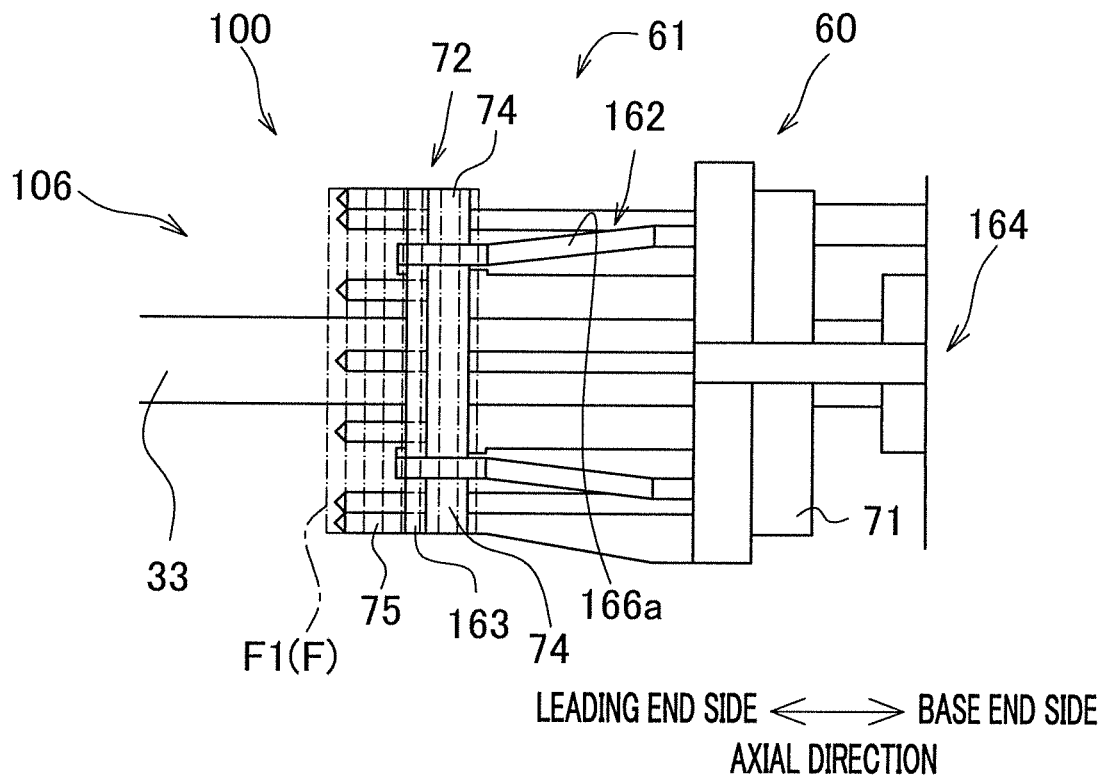
FIGS. 19A and 19B show the remaining yarn peel-off unit at an initial position.
Figure 19B:
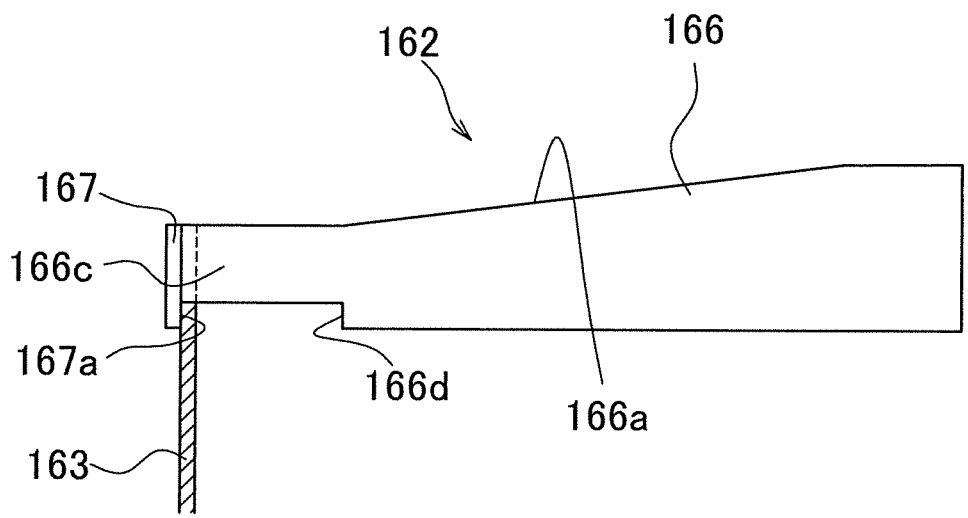

The following will describe the operation of the above-described remaining yarn remover 100 with reference to FIGS. 14A and 14B to 22. FIGS. 14A and 14B show the operations of the first arm unit 102 and the second arm unit 104. FIG. 15 shows the pressing members 122 and 132 shown in FIG. 14B and their surroundings, which are viewed in the front-rear direction. FIG. 16A shows the operations of the first arm unit 102 and the second cutting unit 101. FIG. 16B shows an operation of cutting the remaining yarn F1 by the second cutting unit 101. FIG. 17 shows the pressing members 122 and 132 and the cutter 114 shown in FIG. 16B and their surroundings, which are viewed in the front-rear direction. FIG. 18 show the operations of the first arm units 102 and 103. FIGS. 19A and 19B show the remaining yarn peel-off unit 106 at an initial position. FIGS. 20A, 20B, 21A and 21B illustrate operation of the remaining yarn peel-off unit 106. FIGS. 22A and 22B show the operation of the first arm unit 102 after the completion of the operation of the remaining yarn peel-off unit 106.

In an initial state, the remaining yarn F1 is wound on the outer peripheral portion 72 of the reel member 61 (see FIG. 8F). To begin with, the controller 10 controls the first arm telescopic movement motors 127 and 137 to drive the first movement mechanisms 123 and 133. As a result, the arm member 121 moves in the longitudinal direction of the arm member 121 (see arrow 210 in FIG. 14A) and the arm member 131 moves in the longitudinal direction of the arm member 131. At this stage, in the axial direction of the liner L, the claw portion 122b of the pressing member 122 and the claw portion 132b of the pressing member 132 move to locations on the leading end side of the pins 75 of the reel member 61. Furthermore, the controller 10 controls the first arm movement motors 128 and 138 to drive the second movement mechanisms 124 and 134. As a result, the arm members 121 and 131 move inward in the radial direction of the liner L (see arrow 212 in FIG. 14B). At this stage, part of the claw portion 122b of the pressing member 122 and part (on the leading end side) of the claw portion 132b of the pressing member 132 are located just in front of the remaining yarn F1. The pressing members 122 and 132 oppose each other over the second cutting unit 101 in the left-right direction (see FIG. 15).

In addition to the above, the controller 10 controls the second arm telescopic movement motors 144 and 154 to drive the movement mechanisms 143 and 153. As a result, the arm member 141 moves in the longitudinal direction of the arm member 141 (see arrow 211 in FIG. 14A) and the arm member 151 moves in the longitudinal direction of the arm member 151. At this stage, the receivers 142 and 152 move to a location directly below the outer peripheral portion 72 of the reel member 61 or to a location in the vicinity of that location. For example, the controller 10 may simultaneously drive all of the first arm units 102 and 103 and the second arm units 104 and 105.

The controller 10 controls the second cutting unit movement motor 116 (see FIG. 4) and the second cutting unit vertical movement motor 117 (see FIG. 4) to move the cutter 114 in the axial direction of the liner L and in the radial direction of the liner L (see arrows 213 and 214 in FIG. 16A). To be more specific, the controller 10 moves the cutter 114 to a location in the vicinity of the outer peripheral portion 72 of the reel member 61 (i.e., immediately behind the remaining yarn F1). To be more specific, at this stage, the cutter 114 is positioned at a location in the vicinity of the uppermost part of the remaining yarn F1 (i.e., the part at the 12 o'clock position). The controller 10 may start the movement of the cutter 114 after moving the first arm units 102 and 103 and the second arm units 104 and 105 as described above. Alternatively, the controller 10 may move the first arm units 102 and 103, the second arm units 104 and 105, and the cutter 114 at the same time.

The controller 10 controls the first arm telescopic movement motor 127 (see FIG. 4) to move the arm member 121 to the base end side in the axial direction (see arrow 215 in FIG. 16A) and to insert the claw portion 122b between the pins 75. Similarly, the controller 10 controls the first arm telescopic movement motor 137 (see FIG. 4) to move the arm member 131 to the base end side in the axial direction. With this arrangement, the remaining yarn F1 is pressed from the leading end side in the axial direction, by the claw portions 122b and 132b.

The controller 10 then moves the cutter 114 forward (toward the leading end side in the axial direction) (see arrow 216 in FIG. 16B) while rotating the circular blade by controlling the cutter rotation motor 118 (see FIG. 4). As a result, the uppermost part of the remaining yarn F1 in the vertical direction is cut in the axial direction. At this stage, the remaining yarn F1 is pressed from the leading end side in the axial direction by the claw portion 122b of the pressing members 122 and the claw portion 132b of the pressing member 132 (see FIG. 17). As a result, the movement of the remaining yarn F1 toward the leading end side in the axial direction is restricted when the remaining yarn F1 is cut by the second cutting unit 101. It is therefore possible to suppress the deviation of the remaining yarn F1 in the axial direction. Furthermore, as described above, the pressing members 122 and 132 oppose each other over the second cutting unit 101 in the left-right direction (see FIG. 17). It is therefore possible to suppress the deviation of the remaining yarn F1 toward the leading end side in the axial direction. Furthermore, as described above, the groove 74a is formed in the ring member 74 of the reel member 61 whereas the groove 172a is formed in the second peel-off portion 163 of the remaining yarn peel-off unit 106. This arrangement ensures the inward movement of the cutter 114 in the radial direction of the liner L (see FIG. 17), and hence the remaining yarn F1 can be further reliably cut.

Subsequently, the controller 10 moves the arm members 121 and 131 further toward the leading end side (see arrow 217 in FIG. 18). (In FIG. 18, the arm member 131 is not shown.) As a result, the pressing members 122 and 132 are moved to locations in front of the remaining yarn F1 immediately after being cut by the second cutting unit 101. Because the pressing members 122 and 132 are positioned at these locations, it is possible to prevent the remaining yarn F1 from hitting the helical winding unit 50 (see, e.g., FIG. 3) when the remaining yarn F1 is pushed out by the remaining yarn peel-off unit 106 as described below.

Subsequently, the controller 10 controls the remaining yarn peel-off unit movement motor 165 (see FIG. 4) to drive the movement mechanism 164, and move the remaining yarn peel-off unit 106 forward (toward the leading end side in the axial direction). In this connection, before the start of the movement of the remaining yarn peel-off unit 106 (see FIG. 19A), the second peel-off portion 163 is detached from the first regulating surface 166d of the first peel-off portion 162 (see FIG. 19B) as described above. On this account, when the movement mechanism 164 starts to drive, the base portion 161 and the first peel-off portions 162 start to move toward the leading end side in the axial direction, whereas the second peel-off portion 163 moves relative to the first peel-off portions 162. (In other words, the second peel-off portion 163 does not move relative to the reel member 61).

Figure 20A:
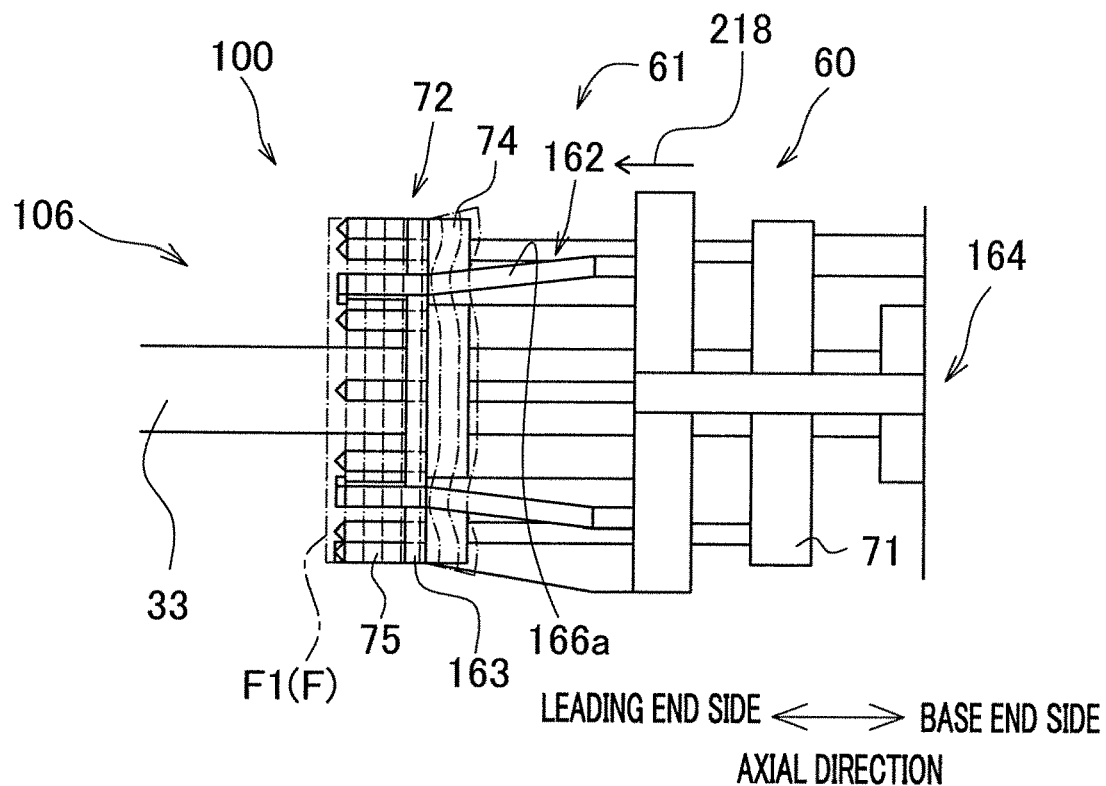
FIGS. 20A and 20B illustrate an operation of the remaining yarn peel-off unit.

When the first peel-off portions 162 move toward the leading end side in the axial direction (see arrow 218 in FIG. 20A), the inclined surface 166a makes contact with the remaining yarn F1 from the inner side in the radial direction of the liner L. As a result, the remaining yarn F1 after being cut in the axial direction by the second cutting unit 101 is lifted up toward the outer side of the outer peripheral portion 72 in the radial direction, as shown in FIG. 20A.

Figure 20B:
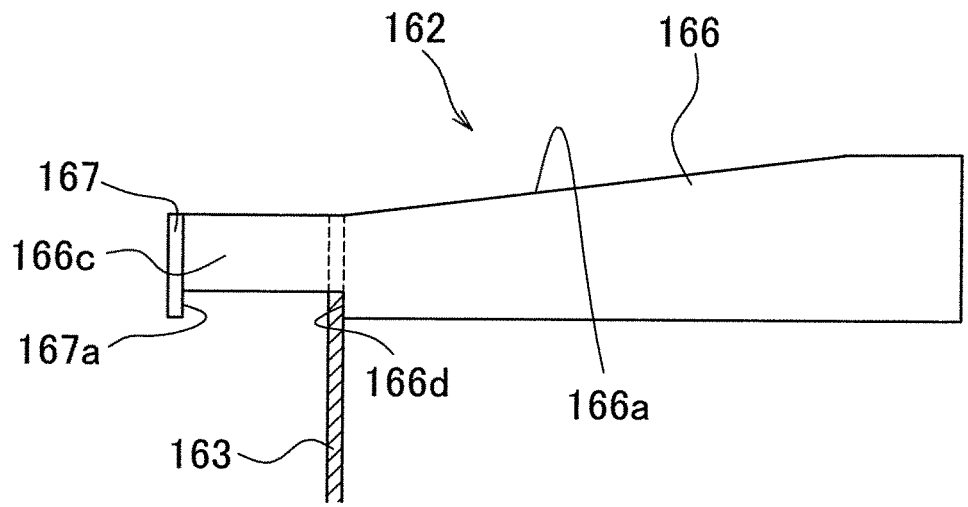
Figure 21A:
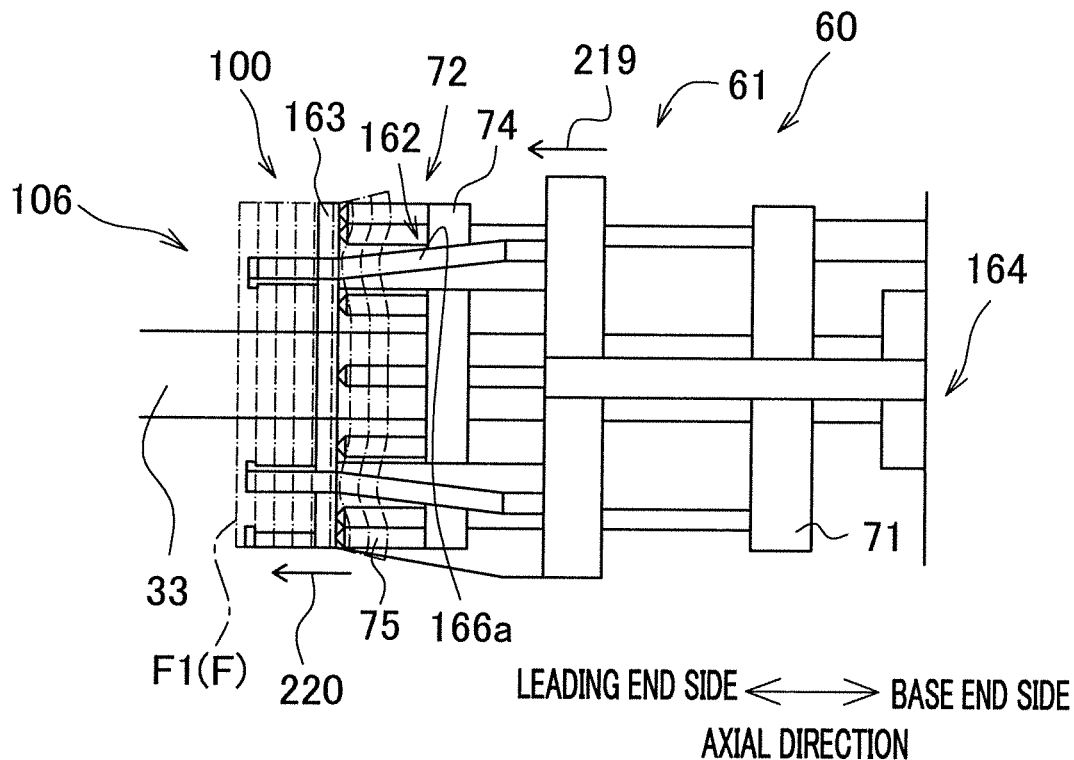
FIGS. 21 and 21B illustrate an operation of the remaining yarn peel-off unit.
Figure 21B:
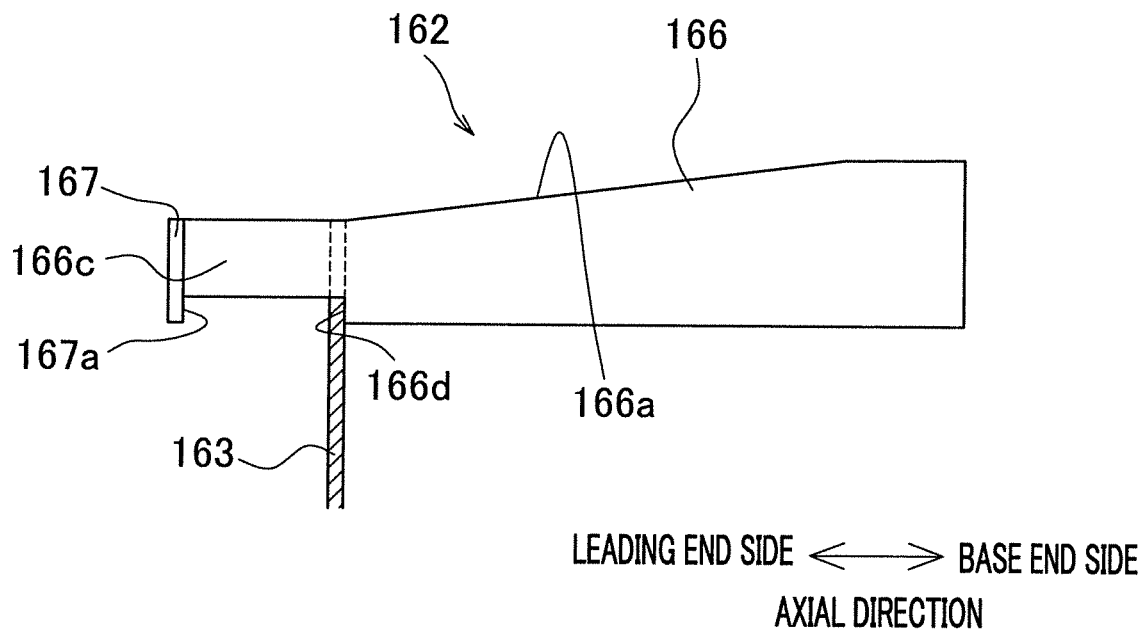

As described above, the movable range (distance A shown in FIG. 12A) of the second peel-off portion 163 in the axial direction of the liner L is shorter than the movable range (distance B shown in FIG. 13) of the first peel-off portion 162 in the axial direction. On this account, when the first peel-off portion 162 is further moved toward the leading end side in the axial direction (i.e., moved from the standby position to the contact position), the first regulating surface 166d makes contact with the second peel-off portion 163 during the movement of the first peel-off portion 162, as shown in FIGS. 20A and 20B. The second peel-off portion 163 is therefore pressed by the first regulating surface 166d (see FIGS. 21A and 21B) and moved toward the leading end side in the axial direction together with the first peel-off portion 162 (see arrows 219 and 220 in FIG. 21A). As such, the second peel-off portion 163 is moved from the retracted position to a pushing position. As a result, the remaining yarn F1 entwined around the pins 75 of the reel member 61 is pushed toward the leading end side in the axial direction by the second peel-off portion 163 (see FIG. 21A).

Figure 22A:
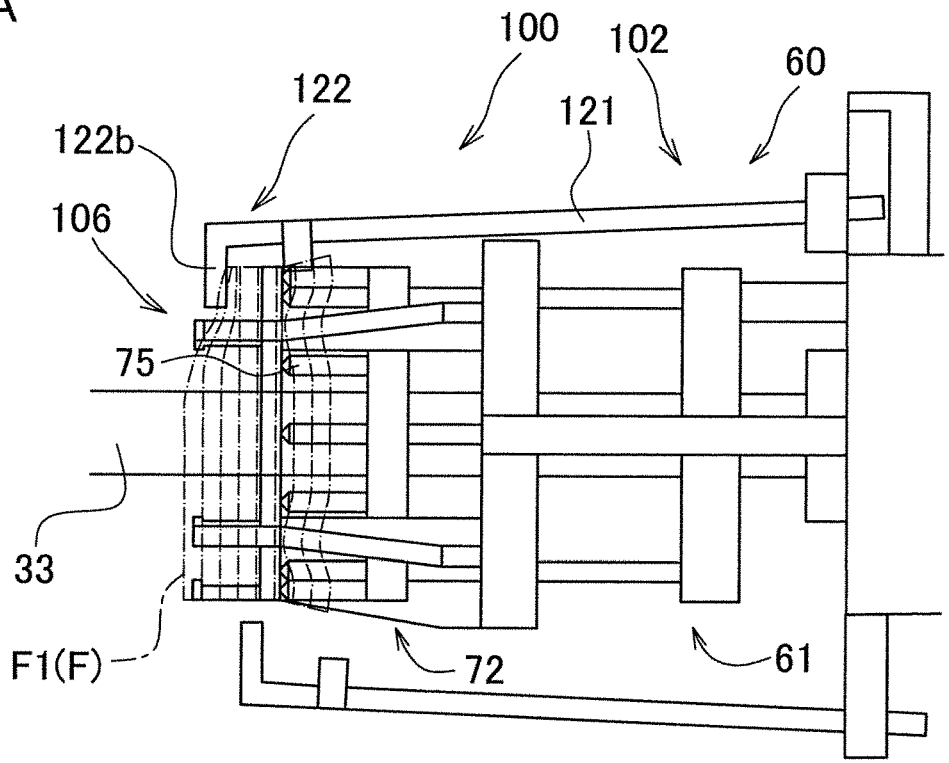
FIGS. 22A and 22B show an operation of the first arm unit.

The remaining yarn F1 having been pushed toward the leading end side in the axial direction is received by, for example, the pressing member 122 of the first arm unit 102 (see FIG. 22A). It is therefore possible to prevent the remaining yarn F1 from hitting the helical winding unit 50 (see, e.g., FIG. 3).

Figure 22B:
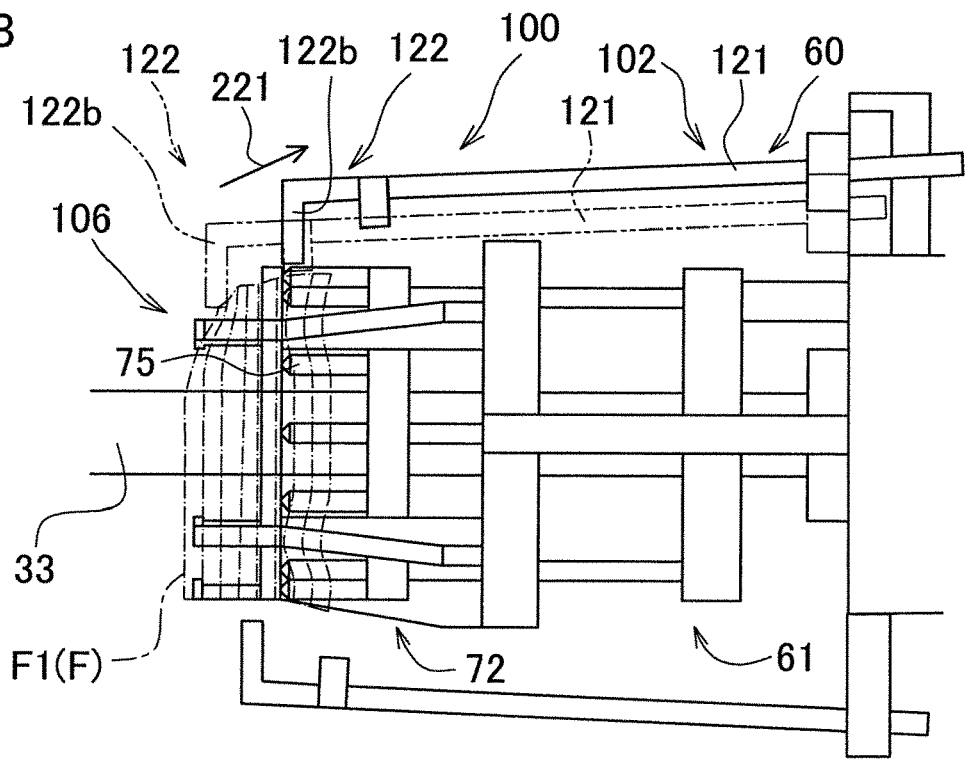

Subsequently, the controller 10 controls the first arm telescopic movement motor 127 (see FIG. 4) to move the arm member 121 outward in the radial direction and toward the base end side in the axial direction (see arrow 221 in FIG. 22B). Similarly, the controller 10 controls the first arm telescopic movement motor 137 (see FIG. 4) to move the arm member 131 outward in the radial direction and toward the base end side in the axial direction. As a result, the remaining yarn F1 is hooked by the claw portion 122b of the pressing member 122 and the claw portion 132b of the pressing member 132, and the remaining yarn F1 is further peeled by the claw portions 122b and 132b.

In this way, the remaining yarn F1 is easily removable from the outer peripheral portion 72 of the reel member 61. Thereafter, as the controller 10, for example, rotates the reel member 61 about the axis of the liner L, the remaining yarn F1 drops onto the second arm units 104 and 105 by its own weight, with the result that the remaining yarn F1 is removed from the reel member 61. Then all components of the remaining yarn remover 100 are returned to the initial positions. When the first peel-off portion 162 is returned from the contact position to the standby position, the second peel-off portion 163 is moved by the second regulating surface 167a toward the base end side in the axial direction back to the retracted position.

As described above, the second cutting unit 101 is able to cut the remaining yarn F1 in the axial direction. This makes it easy to remove the remaining yarn F1 from the outer peripheral portion 72. The time and labor required for removing the remaining yarn F1 are therefore reduced.

In addition to the above, the pressing members 122 and 132 make it possible to suppress the remaining yarn F1 from slipping in the axial direction and being deviated, when the second cutting unit 101 cuts the remaining yarn F1. Smooth cutting of the remaining yarn F1 is therefore facilitated.

In addition to the above, because the pressing member 122 of the first arm unit 102 and the pressing member 132 of the first arm unit 103 sandwich the second cutting unit 101, the movement of the remaining yarn F1 in the axial direction is restricted from the both sides. It is therefore possible to further ensure the suppression of the deviation of the remaining yarn F1 in the axial direction.

In addition to the above, the remaining yarn F1 having been cut by the second cutting unit 101 is lifted up from the outer peripheral portion 72 by the first peel-off portion 162. It becomes further easy to remove the remaining yarn F1.

In addition to the above, only by moving the first peel-off portions 162 in the axial direction, the inclined surface 166a causes the remaining yarn F1 to be lifted outward in the radial direction from the outer peripheral portion 72. As such, the remaining yarn F1 can be lifted up from the outer peripheral portion 72 by a simple arrangement.

In addition to the above, as the second peel-off portion 163 is moved from the retracted position to the pushing position, the remaining yarn F1 entwined around the pins 75 is pushed out by the second peel-off portion 163. It is therefore possible to effectively remove the remaining yarn F1 entwined around the pins 75.

In addition to the above, it is possible to start operation of the second peel-off portion 163 after the start of the operation of the first peel-off portion 162. On this account, the operation of the second peel-off portion 163 can be started after the remaining yarn F1 is lifted up from the outer peripheral portion 72 to some degree by the first peel-off portion 162. This makes it easy to peel off the remaining yarn by the second peel-off portion 163. When the first peel-off portion 162 is returned from the contact position to the standby position, the second peel-off portion 163 is moved by the second regulating surface 167a toward the base end side in the axial direction.

In addition to the above, the uppermost part of the remaining yarn F1 in the vertical direction is cut by the second cutting unit 101. This makes it easy to cause the remaining yarn F1 having been cut in the axial direction to drop off from the reel member 61 by its own weight. It becomes easier to remove the remaining yarn F1.

The following describes modifications of the above-described example. The members identical with those in the example above will be denoted by the same reference numerals, and the explanations thereof are not repeated.

(1) In the example above, the uppermost part of the remaining yarn F1 in the vertical direction is cut by the second cutting unit 101. The disclosure, however, is not limited to this arrangement. Any part of the remaining yarn F1 in the vertical direction may be cut by the second cutting unit 101 as long as the remaining yarn F1 is cut in the axial direction.

(2) While in the example above the first regulating surface 166d and the second regulating surface 167a are formed in the first peel-off portion 162 of the remaining yarn peel-off unit 106, the disclosure is not limited to this arrangement. In place of these regulating surfaces, for example, a protrusion may be provided to be able to make contact with an end face of the second peel-off portion 163.

(3) While in the example above the second peel-off portion 163 of the remaining yarn peel-off unit 106 is movable relative to the first peel-off portion 162, the disclosure is not limited to this arrangement. For example, the second peel-off portion 163 may be fixed to the first peel-off portion 162.

(4) While in the example above the first peel-off portion 162 of the remaining yarn peel-off unit 106 is movable in the axial direction of the liner L, the disclosure is not limited to this arrangement. The first peel-off portion 162 may be movable in the radial direction of the liner L, for example.

(5) In the example above, the groove 74a is formed in the ring member 74 of the reel member 61 whereas the groove 172a is formed in the second peel-off portion 163 of the remaining yarn peel-off unit 106. These grooves, however, may not be formed.

(6) While in the example above the remaining yarn peel-off unit 106 includes the second peel-off portion 163, the disclosure is not limited to this arrangement. The second peel-off portion 163 may not be provided.

(7) While in the example above the remaining yarn remover 100 includes the remaining yarn peel-off unit 106, the disclosure is not limited to this arrangement.

The remaining yarn peel-off unit 106 may not be provided. After the remaining yarn F1 is cut by the second cutting unit 101, the operator may manually remove the remaining yarn.

(8) In the example above, the first arm units 102 and 103 restrict the movement of the remaining yarn F1 toward the leading end side in the axial direction when the remaining yarn F1 is cut by the second cutting unit 101. The disclosure, however, is not limited to this arrangement. For example, the second cutting unit 101 may be arranged to cut the remaining yarn F1 while moving toward the base end side in the axial direction, and the first arm units 102 and 103 may be arranged to restrict the movement of the remaining yarn F1 toward the base end side in the axial direction.

(9) While in the example above the pair of first arm units 102 and 103 are provided on the respective sides of the second cutting unit 101 in the left-right direction, the disclosure is not limited to this arrangement. For example, only one first arm unit may be provided. Alternatively, three or more first arm units may be provided. Alternatively, the first arm units 102 and 103 may not be provided.

(10) While in the example above the remaining yarn remover 100 includes the second arm units 104 and 105, the disclosure is not limited to this arrangement. In place of the second arm units 104 and 105, for example, a waste box receiving the remaining yarn F1 having been cut may be provided below the reel member 61.

(11) While in the example above the helical winding unit 50 is fixed to the base 20, the disclosure is not limited to this arrangement. The helical winding unit 50 may be arranged to be movable in the front-rear direction, for example. In other words, the helical winding unit 50 and the supporting unit 30 are movable in the axial direction in a relative manner.

(12) While in the example above the fiber bundle retainer 60 includes the remaining yarn remover 100, the disclosure is not limited to this arrangement. The above-described remaining yarn remover may be attached to the helical winding unit 50, or may be supported by the base 20 to be movable, for example.

(13) While in the example above the axial direction of the liner L is in parallel to the horizontal direction, the disclosure is not limited to this arrangement. The axial direction of the liner L may be inclined relative to the horizontal direction, as long as it has at least a horizontal component.

The invention claimed is:

1. A filament winding device comprising:
a liner supporter that supports a liner to be rotatable about an axis of the liner;
a helical winding unit including fiber bundle guides aligned in a circumferential direction of the liner and guide fiber bundles to the liner;
the filament winding device helical-winding the fiber bundles supplied through the fiber bundle guides onto the rotating liner by moving the liner supporter and the helical winding unit relative to each other in an axial direction of the liner;
a fiber bundle retainer configured to temporarily retain the fiber bundles at least when the liner is replaced, the fiber bundle retainer including:
a reel member including an outer peripheral portion having pins that are movable in the axial direction relative to the fiber bundles supplied through the fiber bundle guides and rotatable about the axis of the liner, the reel member being capable of winding the fiber bundles onto the outer peripheral portion;
a first cutting unit configured to cut a part of each of the fiber bundles in the circumferential direction, the part being between a part of the fiber bundle wound on the outer peripheral portion and a part of the fiber bundle wound on the liner; and
a second cutting unit that is different from the first cutting unit and configured to cut a part of each of the fiber bundles in the axial direction, the part being wound on the outer peripheral portion,
wherein the second cutting unit cuts the fiber bundles by moving toward one side in the axial direction,
the fiber bundle retainer includes at least one fiber bundle pressing member configured to restrict movement of the fiber bundles wound on the outer peripheral portion of the reel member toward the one side in the axial direction, and
the at least one fiber bundle pressing member comprises plural fiber bundle pressing members, and the fiber bundle pressing members are provided to oppose each other with the second cutting unit therebetween.

2. The filament winding device according to claim 1, wherein
the fiber bundle retainer includes a first peel-off portion that is movable between a predetermined standby position and a contact position different from the standby position, and
the first peel-off portion moves from the standby position to the contact position and contacts the fiber bundles wound on the outer peripheral portion of the reel member from inside the fiber bundles wound on the outer peripheral portion of the reel member in a radial direction of the liner to lift up the bundles outward in the radial direction.

3. The filament winding device according to claim 2, wherein
the contact position is on a leading end side of the standby position in the axial direction, and
the first peel-off portion has a contact surface extending outwardly in the radial direction toward a base end side in the axial direction and is provided at least partially outside the outer peripheral portion in the radial direction, and the first peel-off portion is movable in the axial direction.

4. The filament winding device according to claim 3, wherein
the fiber bundle retainer includes a second peel-off portion having insertion holes into which the pins are insertable and movable in a direction in which each of the pins extends, and
the second peel-off portion is movable between a retracted position where the pins are inserted into the insertion holes and a pushing position that is closer to leading ends of the pins than the retracted position is to the leading ends of the pins in the direction in which each of the pins extends.

5. The filament winding device according to claim 4, wherein
the pins extend along the axial direction,
the contact position is closer to the leading ends of the pins than the standby position is to the leading ends of the pins in the axial direction,
the first peel-off portion is movable in the axial direction,
the contact surface extends outward in the radial direction toward base ends of the pins in the axial direction, the first peel-off portion includes: a supporter that supports the second peel-off portion to be movable in the axial direction relative to the first peel-off portion;

a first regulatory portion provided at an end portion on the base end side in the axial direction of the supporter to restrict relative movement of the second peel-off portion toward the base end side; and a second regulatory portion provided at an end portion on the leading end side in the axial direction of the supporter to restrict relative movement of the second peel-off portion toward the leading end side, in the axial direction, a distance at which the second peel-off portion is able to move relative to the first peel-off portion is shorter than distance between the standby position and the contact position, and the second peel-off portion is separated from the first regulatory portion when the first peel-off portion is at the standby position.

6. The filament winding device according to claim 1, wherein the axial direction includes at least a horizontal component, and the second cutting unit cuts a part of the fiber bundles wound on the outer peripheral portion of the reel member which is at a highest position in the vertical direction.

* * * * *